(12) United States Patent
Kim et al.

(10) Patent No.: US 9,986,572 B2
(45) Date of Patent: May 29, 2018

(54) METHOD FOR CHANNEL STATE REPORT IN WIRELESS COMMUNICATION SYSTEM AND APPARATUS THEREFOR

(71) Applicant: LG ELECTRONICS INC., Seoul (KR)

(72) Inventors: Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/313,413

(22) PCT Filed: Jul. 21, 2015

(86) PCT No.: PCT/KR2015/007544
§ 371 (c)(1),
(2) Date: Nov. 22, 2016

(87) PCT Pub. No.: WO2016/024731
PCT Pub. Date: Feb. 18, 2016

(65) Prior Publication Data
US 2017/0188371 A1  Jun. 29, 2017

Related U.S. Application Data

(60) Provisional application No. 62/036,594, filed on Aug. 12, 2014.

(51) Int. Cl.
*H04W 24/00* (2009.01)
*H04W 72/08* (2009.01)
(Continued)

(52) U.S. Cl.
CPC ........ *H04W 72/082* (2013.01); *H04B 7/0626* (2013.01); *H04B 17/24* (2015.01);
(Continued)

(58) Field of Classification Search
CPC .... H04W 72/082; H04W 24/10; H04B 17/24; H04B 7/0626; H04B 17/382; H04L 12/2628; H04L 1/0026; H04L 49/20
(Continued)

(56) References Cited

U.S. PATENT DOCUMENTS 8,099,052 B2 * 1/2012 Cho ................. H04B 7/022
455/296
9,210,605 B2 * 12/2015 Yoo ................. H04L 1/0026
(Continued)

FOREIGN PATENT DOCUMENTS

WO  WO 2013/048030 A2  4/2013

OTHER PUBLICATIONS

Catt, "CSI Feedback in TDD eIMTA," 3GPP TSG RAN WG1 Meeting #76, R1-140065, Prague, Czech Republic, Feb. 10-14, 2014, 4 pages.
(Continued)

*Primary Examiner* — Marceau Milord
(74) *Attorney, Agent, or Firm* — Birch, Stewart, Kolasch & Birch, LLP

(57) ABSTRACT

A method for reporting channel state information by a UE having an interference removal ability in a wireless communication system according to an embodiment of the present invention may comprise the steps of: receiving, from a serving cell, information for removal of interference by an adjacent cell; removing the interference or calculating the channel state information and transmitting the calculated channel state to the serving cell, wherein the information for removal of interference may comprise information indicating whether interference by a transmission signal of the adjacent cell exists in a CSI-interference measurement (IM) resource of the serving cell.

18 Claims, 7 Drawing Sheets

(51) Int. Cl.
*H04W 24/10* (2009.01)
*H04B 17/24* (2015.01)
*H04B 17/382* (2015.01)
*H04B 7/06* (2006.01)
*H04L 1/00* (2006.01)
*H04L 12/931* (2013.01)

(52) U.S. Cl.
CPC ......... *H04B 17/382* (2015.01); *H04L 1/0026* (2013.01); *H04L 49/20* (2013.01); *H04W 24/10* (2013.01)

(58) Field of Classification Search
USPC .......................... 455/452.2, 63.1, 67.11, 501
See application file for complete search history.

(56) References Cited

U.S. PATENT DOCUMENTS

| | | | | |
|---|---|---|---|---|
| 9,374,719 | B2* | 6/2016 | Xu | H04W 24/02 |
| 9,450,658 | B1* | 9/2016 | Moon | H04B 7/0486 |
| 9,455,816 | B2* | 9/2016 | Ashikhmin | H04L 5/0032 |
| 9,485,003 | B2* | 11/2016 | Ohwatari | H04B 7/08 |
| 9,544,037 | B2* | 1/2017 | Park | H04B 7/0626 |
| 9,668,275 | B2* | 5/2017 | Park | H04W 72/1231 |
| 9,680,591 | B2* | 6/2017 | Park | H04J 11/005 |
| 2009/0280747 | A1* | 11/2009 | Sudarshan | H04L 25/0204 455/63.1 |
| 2013/0242774 | A1* | 9/2013 | Wang | H04W 36/30 370/252 |
| 2013/0244647 | A1* | 9/2013 | Makh | H04W 48/16 455/434 |
| 2013/0244657 | A1* | 9/2013 | Wang | H04W 36/24 455/436 |
| 2013/0273920 | A1* | 10/2013 | Magadi Rangaiah | H04W 48/20 455/437 |
| 2014/0153488 | A1* | 6/2014 | Koivisto | H04B 1/10 370/328 |
| 2014/0204857 | A1* | 7/2014 | Mallik | H04L 1/0009 370/329 |
| 2015/0296540 | A1* | 10/2015 | Yum | H04J 11/00 370/329 |
| 2016/0080094 | A1* | 3/2016 | Kim | H04L 5/001 455/63.1 |
| 2016/0192373 | A1* | 6/2016 | Li | H04J 11/003 370/329 |
| 2017/0188371 | A1* | 6/2017 | Kim | H04W 24/10 |

OTHER PUBLICATIONS

Intel Corporation, "Discussion on Remaining Details of CSI Feedback for eIMTA Support," 3GPP TSG RAN WG1 Meeting #76, R1-140110, Prague, Czech Republic, Feb. 10-14, 2014, pp. 1-7.

LG Electronics, "Considerations on CRS Interference Handling," 3GPP TSG RAN WG1 Meeting #70, R1-123511, Qingdao, China, Aug. 13-17, 2012, pp. 1-3.

LG Electronics, "Details of CSI Measurement and Report for TDD eIMTA," 3GPP TSG RAN WG1 Meeting #74bis, R1-134386, Guangzhou, China, Oct. 7-11, 2013, pp. 1-4.

* cited by examiner

FIG. 5
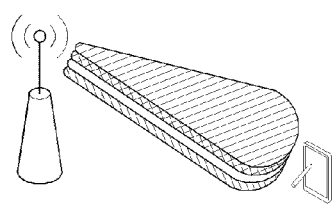
(a)
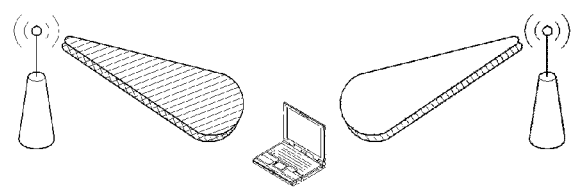
(b)
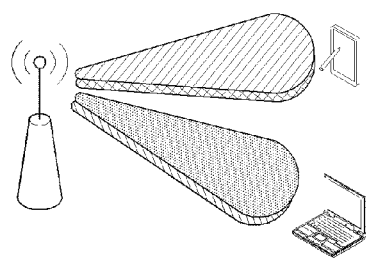
(a)
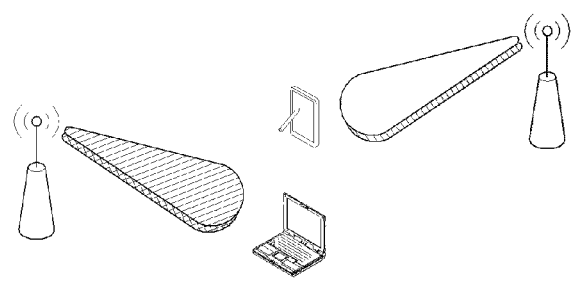
(d)

METHOD FOR CHANNEL STATE REPORT IN WIRELESS COMMUNICATION SYSTEM AND APPARATUS THEREFOR

CROSS REFERENCE TO RELATED APPLICATIONS

This application is the National Phase of PCT International Application No. PCT/KR2015/007544, filed on Jul. 21, 2015, which claims priority under 35 U.S.C. 119(e) to U.S. Provisional Application No. 62/036,594, filed on Aug. 12, 2014, all of which are hereby expressly incorporated by reference into the present application.

TECHNICAL FIELD

The present invention relates to a wireless communication system, and more particularly, to a method for channel state report in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently supporting report of channel state information in a wireless communication system.

Another object of the present invention is to provide a method for utilizing an interference cancellation capability of a terminal during report of channel state information.

The technical problems solved by the present invention are not limited to the above technical problems and those skilled in the art may understand other technical problems from the following description.

Technical Solution

In an aspect of the present invention, provided is a method for reporting channel state information (CSI) by a terminal having an interference cancellation capability in a wireless communication system, the method comprising receiving, from a serving cell, information for interference cancellation by a neighboring cell; calculating the interference cancellation or the channel state information in accordance with the received information for interference cancellation; and transmitting the calculated channel state to the serving cell, wherein the information for interference cancellation may include information indicating whether interference by a transmission signal of the neighboring cell exists in a CSI-interference measurement (IM) resource of the serving cell.

Alternatively or additionally, the information for interference cancellation may include a cell ID (identifier) of the neighboring cell and a transmission mode related to the transmission signal.

Alternatively or additionally, the information for interference cancellation may include a zero-power channel state information-reference signal (CSI-RS) configuration of the neighboring cell.

Alternatively or additionally, if a resource indicated by the zero-power CSI-RS configuration of the neighboring cell is the same as the CSI-IM resource of the serving cell, the terminal may not perform the interference cancellation in the CSI-IM resource, and if the resource indicated by the zero-power CSI-RS configuration of the neighboring cell is the same as the CSI-IM resource of the serving cell, the terminal may perform the interference cancellation in the CSI-IM resource.

Alternatively or additionally, the calculating the channel state information may include calculating the channel state information depending on whether the interference cancellation is reflected in calculation of the channel state information designated per a CSI process configured for the terminal or per a CSI-IM constituting the CSI process.

Alternatively or additionally, the calculating the channel state information may include calculating the channel state information depending on the number of CSI processes configured for the terminal or the number of CSI-IMs constituting the CSI processes.

Alternatively or additionally, the interference cancellation may be reflected in calculation of the channel state information if the number of CSI processes configured for the terminal or the number of CSI-IMs constituting the CSI processes is N (N is an integer greater than 1) or less, and the interference cancellation may be not reflected in calculation of the channel state information if the number of CSI processes configured for the terminal or the number of CSI-IMs constituting the CSI processes exceeds N.

Alternatively or additionally, the calculating the channel state information may include calculating the channel state information depending on IDs (identifiers) of CSI processes configured for the terminal or CSI-IMs constituting the CSI processes.

Alternatively or additionally, the interference cancellation may be reflected in calculation of the channel state information if an ID of a CSI process configured for the terminal or a CSI-IM constituting the CSI process is N (N is an integer greater than 1) or less, and the interference cancellation may not be reflected in calculation of the channel state information if an ID of a CSI process configured for the terminal or a CSI-IM constituting the CSI process exceeds N.

In another aspect of the present invention, provided is a terminal having an interference cancellation capability, configured to report channel state information (CSI) in a wireless communication system, the terminal comprising a radio frequency (RF) unit; and a processor configured to control the RF unit, wherein the processor may be further configured to: receive, from a serving cell, information for interference cancellation by a neighboring cell, calculate the interference cancellation or the channel state information in accordance with the received information for interference cancellation, and transmit the calculated channel state to the serving cell, and the information for interference cancellation may include information indicating whether interference by a transmission signal of the neighboring cell exists in a CSI-interference measurement (IM) resource of the serving cell.

Alternatively or additionally, the information for interference cancellation may include a cell ID (identifier) of the neighboring cell and a transmission mode related to the transmission signal.

Alternatively or additionally, the information for interference cancellation may include a zero-power channel state information-reference signal (CSI-RS) configuration of the neighboring cell.

Alternatively or additionally, if a resource indicated by the zero-power CSI-RS configuration of the neighboring cell is the same as the CSI-IM resource of the serving cell, the processor may be configured so as not to perform the interference cancellation in the CSI-IM resource, and if the resource indicated by the zero-power CSI-RS configuration of the neighboring cell is the same as the CSI-IM resource of the serving cell, the processor may be configured to perform the interference cancellation in the CSI-IM resource.

Alternatively or additionally, the processor may be configured to calculate the channel state information depending on whether the interference cancellation is reflected in calculation of the channel state information designated per a CSI process configured for the terminal or per a CSI-IM constituting the CSI process.

Alternatively or additionally, the processor may be configured to calculate the channel state information depending on the number of CSI processes configured for the terminal or the number of CSI-IMs constituting the CSI processes.

Alternatively or additionally, the processor may be configured to reflect the interference cancellation in calculation of the channel state information if the number of CSI processes configured for the terminal or the number of CSI-IMs constituting the CSI processes is N (N is an integer greater than 1) or less, and may be configured so as not to reflect the interference cancellation in calculation of the channel state information if the number of CSI processes configured for the terminal or the number of CSI-IMs constituting the CSI processes exceeds N.

Alternatively or additionally, the processor may be configured to calculate the channel state information depending on IDs (identifiers) of CSI processes configured for the terminal or CSI-IMs constituting the CSI processes.

Alternatively or additionally, the processor may be configured to reflect the interference cancellation in calculation of the channel state information if an ID of a CSI process configured for the terminal or a CSI-IM constituting the CSI process is N (N is an integer greater than 1) or less, and may be configured so as not to reflect the interference cancellation in calculation of the channel state information if an ID of a CSI process configured for the UE or a CSI-IM constituting the CSI process exceeds N.

Advantageous Effects

According to one embodiment of the present invention, report of channel state information can efficiently be performed in a wireless communication system.

Also, in one embodiment of the present invention, since an interference cancellation capability of a UE can be used during report of channel state information, more efficient resource scheduling can be performed for the UE.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows various multi-input multi-output (MIMO) environments in a 3GPP LTE/LTE-A system;

BEST MODE FOR CARRYING OUT THE INVENTION

Figure 1:
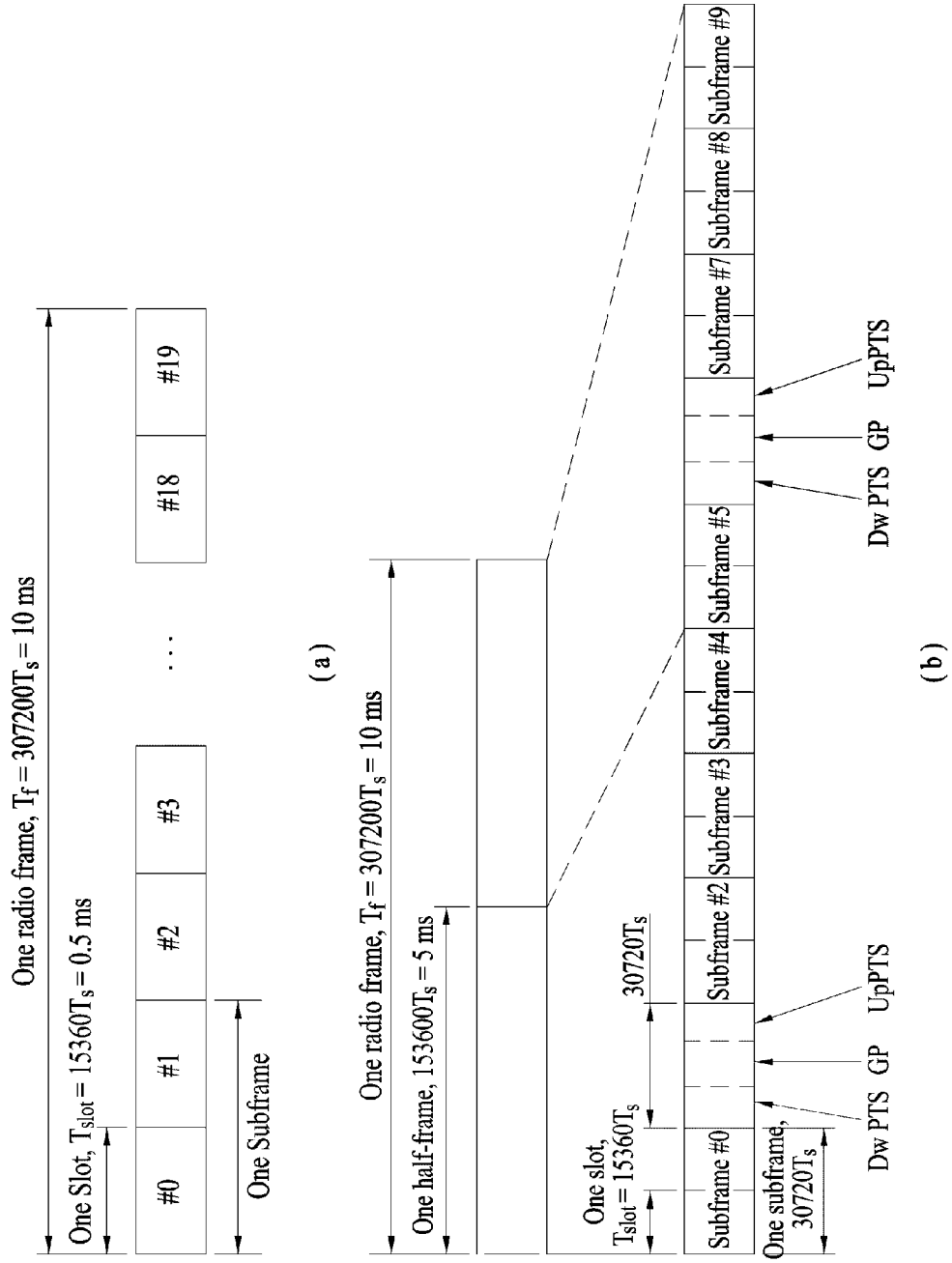
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
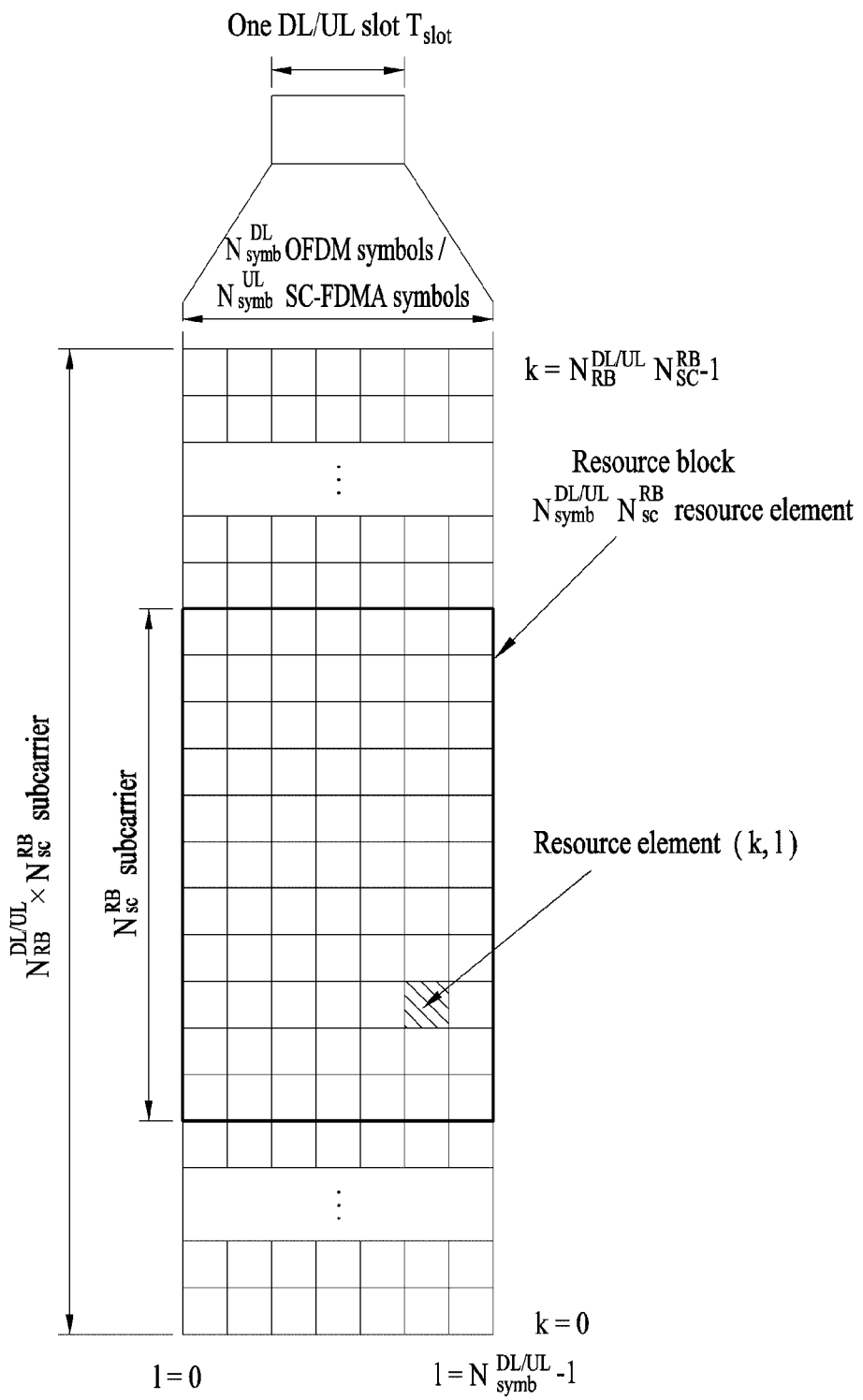
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, RB denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
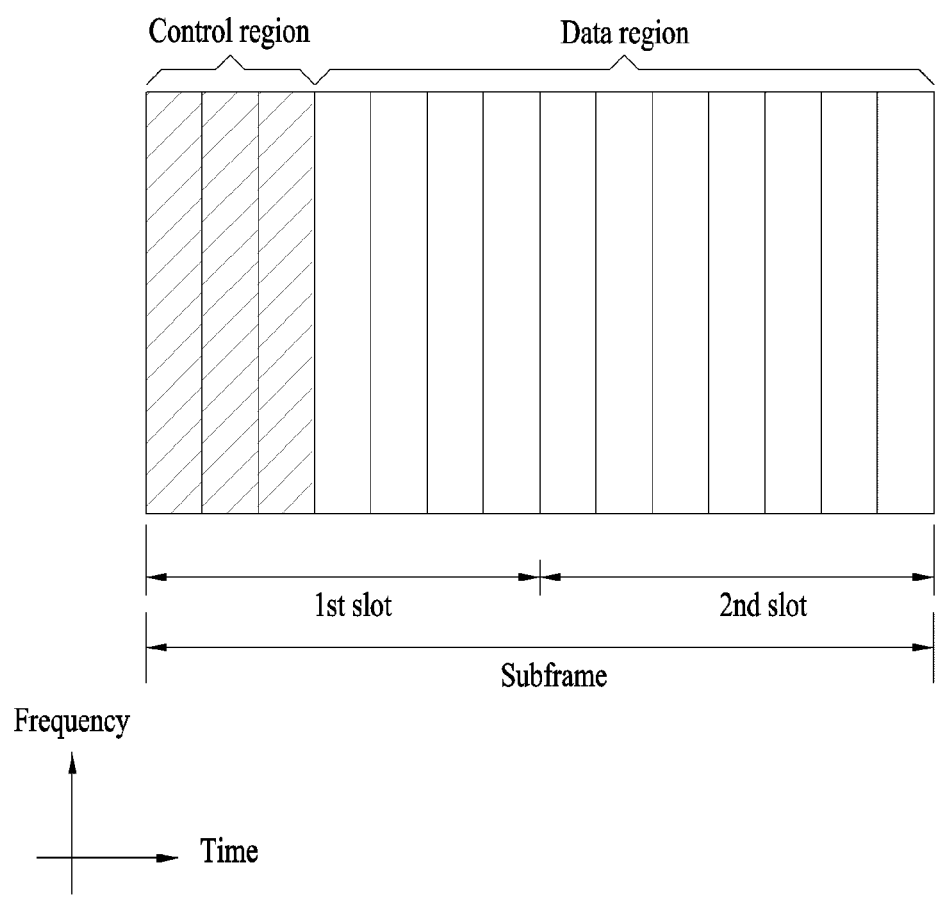
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
| --- | --- | --- | --- |
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
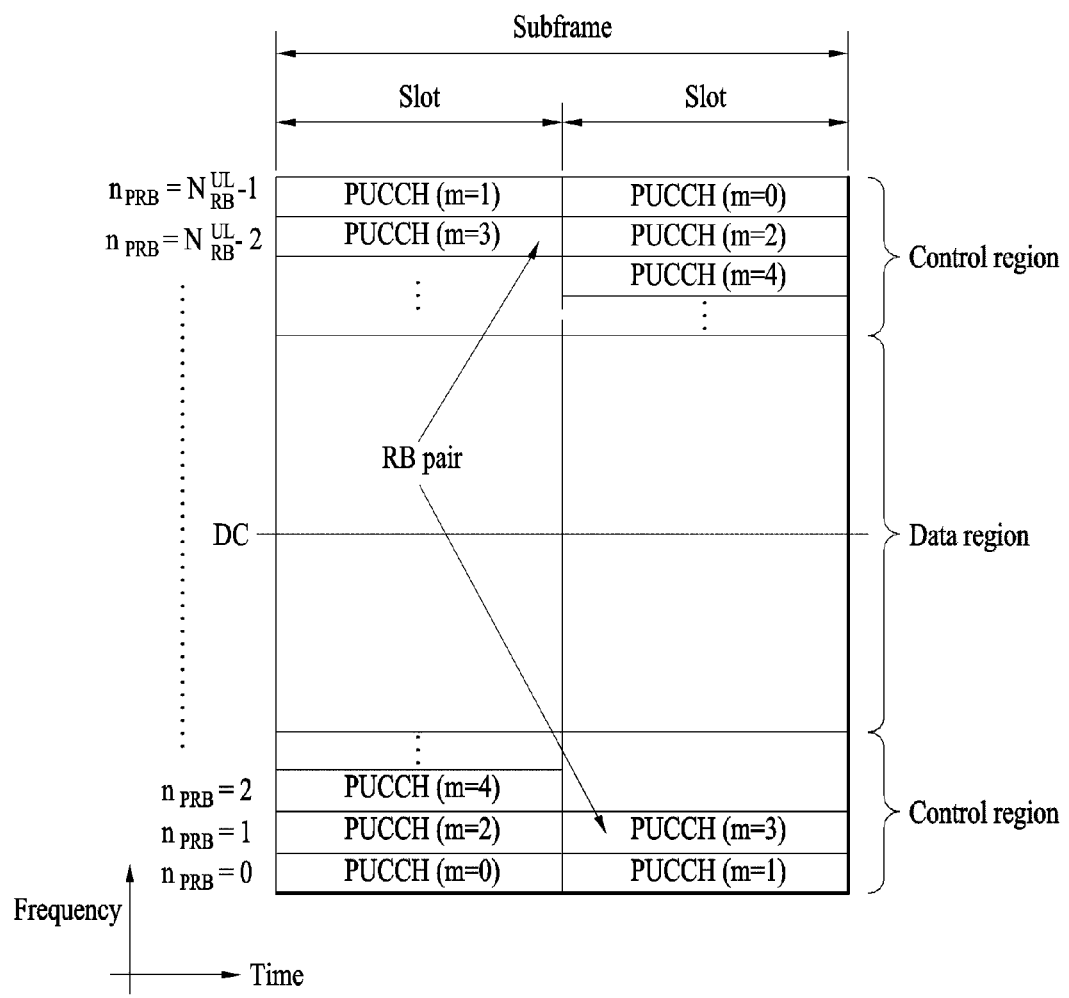
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Coordinated Multi-point (CoMP) Transmission and Reception

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

A plurality of UL points (that is, receiving points (RPs)) is referred to as UL CoMP and a plurality of DL points (that is, transmitting points (TPs)) is referred to as DL CoMP.

Enhanced-PDCCH (EPDCCH)

In an LTE system of LTE Release 11 or later, as a solution for PDCCH capacity lack due to CoMP, multi user-multiple input multiple output (MU-MIMO) and PDCCH performance reduction due to inter-cell interference, an enhanced-PDCCH (EPDCCH) which may be transmitted via a conventional PDSCH region is considered. In the EPDCCH, in order to obtain precoding gain, unlike to an existing CRS based PDCCH, channel estimation may be performed based on a DMRS.

EPDCCH transmission may be divided into localized EPDCCH transmission and distributed EPDCCH transmission according to the configuration of a PRB pair used for EPDCCH transmission. Localized EPDCCH transmission means the case in which enhanced control channel elements (ECCEs) used to transmit one piece of DCI are contiguous in the frequency domain and specific precoding is applicable in order to obtain beamforming gain. For example, localized EPDCCH transmission may be based on consecutive ECCEs corresponding in number to an aggregation level. In contrast, distributed EPDCCH transmission means that one EPDCCH is transmitted on a PRB pair separated in the frequency domain and has frequency diversity gain. For example, distributed EPDCCH transmission may be based on ECCEs each including enhanced resource element groups (EREGs) included each PRB pair separated in the frequency domain.

A UE may perform blind decoding similarly to an existing LTE/LTE-A system, in order to receive/acquire control information (DCI) via an EPDCCH. More specifically, the UE may attempt (monitor) decoding of a set of EPDCCH candidates per aggregation level, for DCI formats corresponding to a configured transmission mode. Here, the set of EPDCCH candidates to be monitored may be referred to as an EPDCCH UE-specific search space and this search space may be set/configured per aggregation level. In addition, differently from the above-described existing LTE/LTE-A system, {1, 2, 4, 8, 16, 32} is possible as an aggregation level according to subframe type, CP length, the amount of available resources in a PRB pair, etc.

A UE, in which an EPDCCH is configured, indexes REs included in a PRB pair set in EREG units and indexes the EREGs in ECCE units. The UE may determine EPDCCH candidates configuring a search space based on the indexed ECCEs to perform blind decoding, thereby receiving control information. Here, the EREG corresponds to an REG of the existing LTE/LTE-A system and the ECCE corresponds to a CCE. One PRB pair may include 16 EREGs.

In addition, for each serving cell, one UE may configure one or two EPDCCH PRB sets for PDCCH monitoring via higher layer signaling.

In 3GPP LTE Rel-11, a UE, to which a CoMP scheme is applied, may estimate channels of TPs, which may potentially participate in CoMP, using channel state information-reference signal (CSI-RS) resources defined as a CoMP measurement set and feed CSI such as precoding matrix indicator (PMI), channel quality indicator (CQI) or rank indicator (RI) back to a serving cell thereof based on the estimated channel values. A network may configure a dynamic point selection (DPS) scheme for selecting a TP having relatively excellent channel quality based on the fed-back CSI information to enable the UE to perform data transmission, a coordinated scheduling/coordinated beamforming (CS/CB) scheme for, at TPs participating in CoMP, controlling scheduling and beamforming to reduce mutual interference and a joint transmission (JT) scheme for, at TPs participating in CoMP, transmitting the same data to the UE.

The present invention relates to information provided by a network (or an eNB) and an inter-network coordination scheme in order to improve received signal performance of a UE including a high-performance receiver having interference cancellation (IC) capabilities.

In general, a cellular mobile communication system is an interference-limited system due to inter-cell interference in an urban environment and reaches system capacity limit. In addition, if a MIMO scheme, that is, an SU-MIMO scheme or a MU-MIMO scheme, is applied such that one eNB transmits a multi-layer signal of multiple beams, inter-layer interference in a cell is also a main factor for deciding system capacity limit. Therefore, in order to reduce inter-cell interference and intra-cell interference, standardization and development of a coordinated transmission and high-performance receiver scheme becomes important and numerous efforts in that direction have been made.

A downlink CoMP scheme configures transmission beams such that inter-cell interference and intra-cell interference are minimized in a transmitter based on channel state information received from a receiver. In the downlink CoMP scheme, complexity of the UE in a data reception process is not increased, but performance of the CoMP scheme largely depends on accuracy of a channel state information report. The high-performance receiver scheme obtains better reception performance using properties of an interference signal at a receiver. In the high-performance receiver scheme, how the UE acquires information on the interference signal transmitted along with a signal (that is, a desired signal) scheduled thereto becomes important. Representative examples of the high-performance receiver scheme may include:

linear MMSE IRC receiver,
maximum likelihood detection receiver, and
interference cancellation receiver.

As performance increases, information on a larger number of interference signals is required. For example, in an iterative decoding interference cancellation receiver known to have highest performance, since a UE decodes an interference signal and regenerates an interference signal in order to cancel interference, all information for decoding the interference signal is necessary.

In the present specification, a method for cancelling an interference signal from a received signal after demodulating the interference signal without decoding will be focused upon. In particular, as a method for cancelling a co-scheduled interference signal, an interference cancellation method using a DM-RS of an interference signal on the assumption that a PDSCH is transmitted based on the DM-RS will be focused upon.

If a PDSCH co-scheduled to an RB scheduled to a specific UE is an interference signal, in order to cancel the interference signal, an eNB must provide information on the interference signal to a UE. In order to estimate an interference level using a DM-RS, the UE must know a sequence of the DM-RS of the interference signal. Therefore, the eNB must provide seed information of the sequence of the DM-RS of the interference signal to the UE and the UE estimates/cancels the interference signal using the seed information of the sequence of the DM-RS.

First, as interference received by a specific UE, there may be a signal of another layer scheduled to the specific UE. As shown in FIGS. 5(a) and 5(b), in case of single-cell SU-MIMO and multi-cell SU-MIMO, interference from another layer co-scheduled to a specific RB must be cancelled. In this case, all necessary information for interference cancellation is included in a DL control channel transmitted to a UE.

Unlike FIGS. 5(a) and 5(b), in FIGS. 5(c) and 5(d), when a UE receives control information of a PDSCH, control information of an interference signal is not received. FIGS. 5(c) and 5(d) show examples of single-cell SU-MIMO and multi-cell SU-MIMO, respectively. In the present specification, a method for improving interference cancellation performance of a receiver of a UE in the examples shown in FIGS. 5(c) and 5(d) is proposed.

Hereinafter, embodiment(s) of the present invention will be described. In the present specification, assume that a signal received by a UE includes a desired signal and an interference signal. That is, the desired signal is a downlink signal scheduled to the UE and the interference signal corresponds to a downlink signal scheduled to UE(s) different from the UE.

In addition, in the present specification, UE(s) scheduled to receive the interference signal is referred to as an "interference UE".

First Embodiment

First, in case of single-cell MU-MIMO of FIG. 5(c), since one eNB performs scheduling, coordination between eNBs is not necessary. Since both a desired signal (that is, a signal scheduled to a UE) and an interference signal are transmitted from a single eNB, if these two signals are based on a DM-RS, a seed value of a DM-RS sequence of the signals is selected from a single set $\{n_{ID}^{DMRS,0}, n_{ID}^{DMRS,1}, N_{ID}^{cell}\}$. Accordingly, when the UE knows nSCID={0, 1} used for the interference signal, the DM-RS sequence may be generated and a channel value of the interference signal may be estimated using the generated DM-RS sequence. In addition, the eNB must signal all ranks of PDSCHs scheduled in a corresponding subframe in addition to the rank of the desired signal for the purpose of indicating DM-RS density used for scheduled PDSCH transmission PRBs. Additionally, the eNB may inform the UE of a modulation order of the interference signal transmitted to the interference UE in addition to the rank used per nSCID in the corresponding subframe (or the number of scheduled layers) and information on the desired signal to the specific UE. When the interference signal is transmitted using two codewords and the modulation orders of the two codewords are the same, the eNB may inform the UE of one modulation order value and that the modulation orders are the same, thereby reducing signaling overhead.

In summary, in the embodiment shown in FIG. 5(c), the eNB may provide the following information to the UE such that the UE estimates interference using the RS of the interference signal.

When the interference signal is a DM-RS based PSDCH,
  whether nSCID used to generate the DM-RS sequence of the interference or nSCID which is not used for the desired signal is used for the interference signal
  number of layers (ranks) per nSCID
  total number of ranks scheduled in the corresponding subframe
  modulation order per codeword (nSCID)
when the interference signal is a CRS based PDSCH,
  seed value (physical cell identifier) information of a CRS sequence of the interference signal, the number of CRS ports, CRS frequency shift and MBSFN configuration information
  transmitted PMI (TPMI) information of the interference signal
  PMI restriction information: This enables the interference eNB to use only a specific PMI set to aid interference estimation. In single-cell operation, codebook restriction information may be delivered. In multi-cell operation, such information should be transmitted between eNBs and should be delivered to the UE. Alternatively, this indicates that a specific TPMI is not used. The UE may blindly detect PMI of the interference UE in the restricted set.

Information on the interference signal may be dynamically transmitted in a state of being included in downlink control information (DCI) of the desired signal. The eNB transmits control information of the desired signal and control information of the interference signal when transmitting control information to the UE. For example, as shown in Table 5 below, the eNB provides additional information (DCI) for interference cancellation to the UE and the UE estimates an interference level using the additional information and cancels interference from a received signal.

TABLE 5

| Existing DCI | Additional DCI (control information for interference cancellation) |
|---|---|
| Control information of UE (RB allocation, TPC, HARQ, {MCS, NDI, RV" for CW1, {MCS, NDI, RV} for CW21 | Information on interference UE(s)/layer(s) (nSCID, number of layers (ranks) per nSCID, modulation order per codeword, all ranks) |

Second Embodiment

Hereinafter, an embodiment of network signaling for aiding interference cancellation of a UE when a network performs multi-cell MU-MIMO scheduling as shown in FIG. 5(d) will be described. In the scenario shown in FIG. 5(d), a plurality of UEs is scheduled to the same PRB and a target UE receives supplementary information (or control information) for cancelling an interference signal from a serving cell thereof in order to increase reception performance of a desired signal.

Prior to a detailed description, in order to provide the supplementary information for cancelling the interference signal to the target UE in the scenario shown in FIG. 5(d), since scheduling information of a neighbor eNB should be known, network coordination between eNBs is necessary. A coordination degree between eNBs and the type of information signaled to the UE may be changed according to speed and latency of a backhaul link between eNBs.

The backhaul link may roughly be divided into three types.

Ideal backhaul (non-X2) link: As considered in existing LTE Rel.11 CoMP, coordinated eNBs establishes a CoMP cluster and cells in the same CoMP cluster are connected via a backhaul link such as an optical fiber having high capacity and low latency for coordinated scheduling and coordinated data transmission and reception, such that coordinated scheduling is possible, and accurate time synchronization is performed such that coordinated data transmission is possible. In addition, when signals transmitted from cells in the CoMP cluster participating in coordinated transmission are received, it may be assumed that a difference between reception times of signals transmitted from cells due to a propagation delay difference between the cells is in a cyclic prefix (CP) length of an OFDM symbol. In this case, in order to aid interference cancellation of the UE in every subframe, necessary information including dynamic information which may be changed according to subframe may be more accurately provided to the UE via dynamic signaling.

Slow backhaul: This is a general backhaul link having latency of several ms to several tens of ms, in which dynamic information transmission for inter-eNB coordination is impossible. In this link, only coordination such as deliver of semi-static information to neighbor eNB is possible as inter-eNB coordination.

Fast backhaul: This is between the ideal backhaul link and the slow backhaul link and certain fast inter-eNB coordination (for example, latency is equal to or less than 1 ms) may be possible. In addition to information on semi-static neighbor eNBs, restrictive information may be provided to the UE via dynamic signaling to aid interference cancellation of the UE.

As shown in FIG. 5(d), in multi-cell MU-MIMO, the target UE receives the following information from the network in order to cancel the interference signal. Similarly to FIG. 5(c), a method for demodulating the interference signal without decoding to cancel and/or suppress interference will be focused upon.

2-1. Case in which Interference Signal is DM-RS Based Signal

When the amount of interference of the interference signal is estimated and cancelled using a DM-RS, a seed value of a DM-RS sequence is necessary. This seed value includes a cell ID value (a vertical cell ID and a physical cell ID) and nSCID information used when a neighbor cell generates a DM-RS sequence used for UE scheduling upon interfering with the neighbor cell. In addition, in order to increase DM-RS estimation performance, a channel estimate of a CSI-RS and a CRS having density higher than that of a DM-RS may be used and information thereon is necessary. In LTE Rel. 11, this is defined as quasi co-location assumption and is signaled to the UE. That is, the eNB may provide, to the target UE, with which CSI-RS or CRS the QCL assumption of an interference DM-RS sequence is possible. In order to check the density of the DM-RS in a corresponding subframe, the target also requires all rank information in a PRB scheduled in the corresponding subframe. The same effect can be obtained by signaling rank information per (VCID and nSCID) pair to the UE. In addition, a modulation order per codeword of the interference signal may be signaled to the target UE.

Hereinafter, a method for signaling the above-described information will be described. Although a detailed signaling scheme may be changed according to the speed and latency of the backhaul link, a signaling scheme considering a slow backhaul link to a signaling scheme considering an ideal backhaul link are proposed in the present specification.

used by the cells from the cells, configure a set of supplementary information for interference signal cancellation and provide the set of supplementary information to the target UE via higher layer signaling. In addition, the eNB may explicitly inform the UE of one of the set of supplementary information (as "bit value" of Table 6 below). The target UE may estimate and cancel the interference signal based on one of the set of supplementary information.

When the eNBs may exchange dynamic information such as UE scheduling information changed according to subframe, the eNB may check the properties of the interference signal to be transmitted on the current subframe via information exchange with the neighbor cell and select and transmit some of the set of supplementary information already provided via physical layer signaling to the target UE, and the target UE may detect the DM-RS sequence of the interference signal in some of the set to perform interference estimation.

In the above-described two cases, the target UE uses the set of supplementary information received from the eNB to detect whether the interference signal (that is, an interference PDSCH signal) in the candidate set is present in the corresponding subframe. That is, the supplementary information indicated by the PDCCH may be used in the former case and some (subset) of the set of the supplementary information may be used in the latter case. The target UE uses the received supplementary information (e.g., CRS or DM-RS sequence information, QCL information, etc.) to determine whether a reference signal exceeding predetermined reception energy is detected in the corresponding subframe. The target UE estimates an interference channel from the detected reference signal exceeding the predetermined reception energy, detects an interference PDSCH transmitted therewith, and cancels the detected reference signal and an interference PDSCH signal from the entire received signal.

Table 6 below shows an example of information delivered via semi-static signaling of such information.

TABLE 6

| | DM-RS information | | | QCL assumption (non- | | CRS information | | | Rate Matching information | |
|---|---|---|---|---|---|---|---|---|---|---|
| Bit value | VCID (virtual cell ID) ∈ {0, 1, 2, ..., 503} | nSCID ∈ {0, 1} | Rank Restriction | zero power CSI-RS index | PCID (Physical Cell ID) | (CRSPortsNumber, FrequencyShift, MBSFNsubframe pattern) | (NZP) CSI-RS index | ZPCSI-RS index | PDSCH starting Symbol index | Modulation order restriction |
| 0 | nVCID (0) | {0, 1} | — | CSI-RS index(0) | nPCID (0) | PortNum0, Freqshift0, MBSFN_subframe_0 | | | 2 | — |
| 1 | nVCID (1) | {0} | 1 | CSI-RS index(1) | | PortNum1, Freqshift1, MBSFN_subframe_1 | | | 1 | 2 |
| 2 | nVCID (2) | {0} | 2 | | nPCID (2) | PortNum2, Freqshift2, MBSFN_subframe_2 | | | 3 | 4 |
| ... | ... | ... | ... | ... | ... | ... | | | | |

Even when it is difficult for eNBs to exchange dynamic information such as UE scheduling information changed according to subframe, it is possible to semi-statically provide supplementary information for interference signal cancellation to the UE. That is, the eNB may select a candidate group of cells which may interfere with the target UE, receive DM-RS sequence information and QCL information

[Seed Value Set of DM-RS Sequence]

The eNB determines a candidate set which may cause dominant interference with the target UE and transmits the candidate set to the target UE as shown in Table 6. First, a VCID having a value in a range from 0 to 503, which is a seed value of a DM-RS sequence, and an nSCID having any one of 0 or 1 are provided to the target UE. The VCID and the nSCID are referred to as "DM-RS related information". nSCID may have a value of 0 or 1. If both nSCID values 0 and 1 corresponding to the VCID are used, the UE may be informed of these two values. Alternatively, the UE may not be informed of the nSCID value corresponding to the VCID. That is, when the UE is informed of both the nSCID values 0 and 1 corresponding to nVCID(0) in Table 1 above, the UE may generate a DM-RS sequence using nVCID(0) and nSCID=0 to estimate interference and generate a DM-RS sequence using nVCID(0) and nSCID=1 to estimate interference.

If the nVCID(0) value is signaled and the nSCID field value is omitted, the UE generates the DM-RS sequence with respect to all nSCID values (e.g., 0 and 1) corresponding to nVCID(0) to estimate interference. However, in Table 6, if the nSCID value corresponding to a specific VCID is restricted to one value, that is, bit value=1, the UE assumes that the DM-RS sequence of the interference signal using the VCID is generated using the specified nSCID only and performs interference estimation of the DM-RS sequence generated using the specified nSCID only. For example, since only nSCID={0} is signaled with respect to nVCID(1), interference estimation using the DM-RS sequence is performed with respect to nVCID(1) in consideration of nSCID=0 only.

[Rank Restriction]

Rank restriction information may indicate restriction of the rank of the interference signal using the DM-RS. If information on this field is omitted, the UE may blindly detect rank information of the interference signal corresponding to the DM-RS seed value and use the rank information for interference cancellation. However, if a specific rank value is signaled in a rank restriction field, the UE is informed that a maximum rank is restricted to the specific rank value. Accordingly, the UE assumes that the rank greater than the value signaled with respect to the DM-RS sequence (the DM-RS sequence by the signaled VCID value and nSCID) corresponding to the seed value is not used and does not detect the interference DM-RS sequence with respect to the rank greater than the signaled value. For example, in Table 6 above, in case of bit value=0, nSCID=0 and nSCID=1 are used with respect to nVCID(0) to inform the UE that the interference DM-RS sequence may be used. If both nSCID values {0, 1} are signaled without rank restriction, the DM-RS sequence may be blindly detected from rank=1 to rank=8 with respect to nVCID(0) and nSCID0 and may be detected from rank=1 to rank=2 with respect to nSCID1, thereby performing IC. When the rank is restricted with respect to each nSCID value, a maximum rank value supported by each value is predetermined between the eNB and the UE and, when the rank restriction field value is not signaled, the UE blindly detects the DM-RS sequence up to the predetermined maximum rank. In 3GPP Rel.11, the maximum rank is restricted to 8 in case of nSCID=0 and is restricted to 2 in case of nSCID=1.

When bit value=1 in Table 6 above, nSCID is restricted to 0 with respect to nVCID(1) and, at this time, the rank restriction field is 1. In this case, the UE is informed that the rank is restricted to 1 with respect to the interference DM-RS sequence in case of nVCID(1) and NSCID=0. Thus, the UE performs the IC operation with respect to the DM-RS sequence in consideration of rank=1 only without considering interference in case of rank=2. In order to provide such rank restriction information to the UE, rank coordination between eNBs is necessary. That is, information indicating that a rank greater than a predetermined rank is not scheduled with respect to a specific DM-RS sequence, that is, that a specific rank or less is scheduled, during a predetermined time should be exchanged between eNBs.

[Modulation Order or MCS Restriction]

Modulation order restriction information indicates whether the modulation order of the interference signal using the DM-RS sequence is restricted. If information on this field is omitted, the UE blindly detects the modulation order of the interference signal corresponding to the seed value of the DM-RS sequence and uses the modulation order for interference cancellation. However, when a specific modulation order value is signaled in the modulation order restriction field, the UE is informed that a maximum modulation order is restricted to the specific modulation order and the UE blindly demodulates the DM-RS of the interference signal using the specific modulation order value or less. Here, modulation order={2, 4, 6} indicate QPSK, 16QAM and 64QAM, respectively. Of course, a higher modulation order value may be signaled. For example, with respect to the DM-RS having a modulation order restriction value of 4, the UE indicates that the DM-RS is modulated with QPSK or 16QAM. The UE performs demodulation on the assumption that that the DM-RS is modulated with QPSK to detect coordinates in constellation, performs demodulation on the assumption that the DM-RS is modulated with 16QAM to detect coordinates in constellation, determines with which of the two modulation order values modulation is performed, and estimates a channel of an interference signal using the modulation order, thereby cancelling interference.

As another embodiment, the maximum modulation order is set but, instead, a modulation order may be accurately specified to 2, 4 or 6. A specific modulation order may be indicated. In this case, the UE performs modulation using the specific modulation order only, thereby increasing interference cancellation efficiency. Additionally, blind decoding may be performed using the indicated modulation order.

Similarly, instead of modulation order restriction, modulation and coding scheme (MCS) information may be signaled to the UE. The UE is not informed of the modulation order only, but is informed of the modulation order and a code rate. That is, the UE is informed that the MCS is restricted to a specific value or less. Accordingly, the UE is aware that the interference signal corresponding to the seed value of the DM-RS sequence is modulated and coded at the specific MCS level or less, blindly detects the modulation and code rate of the interference DM-RS sequence in a given range only, and estimates the channel of the interference signal using the DM-RS, thereby cancelling interference. The MCS table for the PDSCH defined in current LTE Rel.11 is a combination of a modulation order and a transport block size (TBS) index.

TABLE 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |

TABLE 7-continued

| MCS Index $I_{MCS}$ | Modulation Order $Q_m$ | TBS Index $I_{TBS}$ |
|---|---|---|
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

That is, the MCS index indicates the modulation order and the TBS index, the modulation order has values of {2, 4, 6}, which indicate QPSK, 16QAM and 64QAM, respectively. The TBS index is an indirect code rate indicator and the code rate may be determined according to PDSCH RB allocation and the number of layers. Accordingly, in the present invention, when MCS restriction information is provided, the MCS is restricted to less than specific value, that is, IMCS<10, or the MCS restriction such as 10≤IMCS≤16 is provided, such that the modulation order is precisely restricted. Accordingly, it is possible to perform blind decoding within the indicated modulation order. Such MCS restriction information may be used not only for a demodulation based IC receiver but also for a code based IC receiver.

In order to provide the modulation order or MCS restriction information to the UE, coordination for modulation order or MCS between eNBs is necessary. That is, information indicating that a greater than predetermined modulation order or MCS level is not scheduled with respect to a specific DM-RS sequence, that is, that a less than predetermined modulation order or MCS level is scheduled, or indicating that a predetermined modulation order or MCS level is scheduled during a predetermined time should be exchanged between eNBs. Information on the modulation order or MCS level restriction is equally applicable to a CRS based PDSCH interference signal. When the modulation order and MCS level restriction information is signaled with respect to a PDSCH modulated with a specific CRS, the UE may perform the above-described operation on the assumption that the modulation order or MCS level of the interference signal is restricted to the signaled value or less.

[DM-RS Sequence with Restrictions]

For interference cancellation of the UE, rank restriction or modulation order (or MCS level) restriction between eNBs is set in order to enable the target UE to accurately demodulate and/or decode the interference signal. In general, since the reception SNR of the interference signal is lower than the reception SNR of the desired signal, the UE may not detect and cancel the interference signal by providing information on the interference signal only. In order for the target UE to demodulate and/or decode the interference signal, IC is accurately performed by decreasing the rank and the modulation order or the MCS level, thereby increasing reception performance of the desired signal. As a result, in a structure in which the UE is enabled to perform IC via network coordination, a maximum rank or a high modulation order (or MCS) may not be used even when the signal of the UE is scheduled. Accordingly, the eNB may separately manage DM-RS sequences and resources in order to improve overall system throughput and UE throughput. That is, a PDSCH may be scheduled to UEs, which are located at the center of a cell to have good geometry, using a DM-RS sequence without rank or modulation order restriction and may be scheduled to UEs, which are located at the edge of the cell to interfere with a neighbor cell, using a DM-RS sequence with rank or modulation order restriction.

[QCL Assumption]

In order to increase performance of interference channel estimation using a DM-RS sequence, the eNB provides QCL assumption. QCL assumption is to use a channel property value of another RS having a channel property equal to or similar to that of a specific DM-RS sequence while the density of an RS is higher than that of the DM-RS to increase channel estimation performance of the DM-RS sequence in interference channel estimation of the specific DM-RS sequence. QCL for each antenna port is defined in 3GPP LTE Rel.11. With respect to QCL, two behaviors are defined: Behavior A in which a CRS, a DM-RS and a CSI-RS are transmitted from a serving cell and all antenna ports have the same channel property and Behavior B in which a DM-RS has the same channel property as a specific CSI-RS in modulation of the PDSCH. In Behavior B, QCL between the DM-RS and the CSI-RS and QCL with a specific CRS in a frequency property may be signaled to the UE.

Accordingly, QCL assumption may be delivered with respect to each sequence in a DM-RS sequence candidate group and, for example, a DM-RS sequence and a specific (non-zero power) CSI-RS index may be mapped and delivered. The method of one embodiment of the present invention is not limited to the CoMP structure defined in 3GPP LTE Rel. 11 and thus the CSI-RS index is not limited to the CSI-RS configured for CSI feedback of the UE in the CoMP scheme. Since the UE may not feed CSI back in response to the signaled CSI-RS index, the number of CSI-RSs to be measured by the UE is unnecessarily increased in order to obtain the channel property of the CSI-RS as information aiding estimation of the specific DM-RS sequence. Accordingly, as QCL information for estimating the interference channel of the specific DM-RS sequence, information from a CRS of a specific cell is preferably referred to in addition to the CSI-RS. That is, for QCL assumption, a CSI-RS index or a PCID of a specific cell may be signaled to obtain the channel property from the CRS of the cell.

In case of CoMP scenario 4, since TPs having different locations share the same PCID, signaling only the PCID for QCL assumption is inappropriate. Accordingly, in this case, a CSI-RS index is signaled to the UE. In summary, for QCL assumption, a CSI-RS index or a PCID may be signaled and the UE refers to a channel property from the CSI-RS using the CSI-RS index or the PCID signaled in QCL assumption information only or refers to a channel property using a CRS corresponding to the PCID. If both the CSI-RS index and the PCID are signaled in the QCL information for the specific DM-RS sequence, it is indicated that the specific DM-RS sequence is in a QCL relationship with the signaled CSI-RS index and the CRS corresponding to the signaled PCID. That is, the DM-RS may be in a QCL relationship with the signaled CSI-RS index and, in some cases, may be in a QCL relationship with the CRS corresponding to the signaled PCID. Accordingly, the UE estimates interference, detects an interference signal and cancels interference with respect to each case.

When the CSI-RS index is signaled to the UE for QCL assumption as shown in Table 6 above, the eNB should separately signal a CSI-RS configuration for long-term measurement and QCL assumption to the UE in addition to a CSI-RS configuration for CSI measurement. The CSI-RS configuration may include CSI-RSs for CSI measurement.

[Rate Matching Information]

For the purpose of signaling PDSCH RE mapping of the interference signal and occurrence of CRS interference in a specific RE, CRS information of a neighbor cell is also transmitted. The CRS information includes the number of CRS antenna ports, CRS frequency shift (={0, 1, 2, . . . , 5}) and MBSFN subframe pattern, etc. If the UE is informed that CRS interference occurs to cancel the CRS interference, a physical cell ID of the CRS is signaled instead of CRS frequency shift. That is, by signaling the physical cell ID, the number of CRS antenna ports and the MBSFN subframe pattern as CRS information, the UE is enable to cancel the CRS interference at the CRS location if the UE has CRS interference control capabilities.

In addition, for the purpose of signaling whether interference is caused from an interference signal in a specific RE, CSI-RS information and ZP CSI-RS information of a neighbor cell may also be signaled to the UE. That is, since the PDSCH of the interference signal is not mapped, the UE is prevented from performing IC with respect to the corresponding RE, thereby preventing performance deterioration.

In addition, a CRS-RS index for signaling a PDSCH rate matching pattern of the interference signal may be separately signaled. As another method, a CSI-RS index indicated for QCL assumption may be used. For example, in Table 6 above, since the PDSCH of the interference signal using the DM-RS sequence generated using nVCID(O) and nSCID={0, 1} when the bit value is 0 is in a QCL relationship with the CSI-RS index (0), the UE may obtain the channel property from the CSI-RS index (0) and recognize that the PDSCH of the interference signal corresponds to the CSI-RS index (0) and is transmitted after subjected to rate matching. In this case, separate CSI-RS index signaling for rate matching information is not necessary. If the CSI-RS index for QCL and the separate CSI-RS index for rate matching information are separately signaled, rate matching of the interference signal assumed by the UE follows the separately transmitted CSI-RS index for rate matching information. In Table 6 above, a plurality of CSI-RS indices for providing rate matching information may be signaled. According to UE capabilities, a CSI-RS index received as rate matching information may be used or a QCL CSI-RS index may be used to perform interference cancellation with respect to the CSI-RS in the RE on which the corresponding CSI-RS is transmitted.

Further, a ZP CSI-RS index used for interference signal transmission may also be transmitted to the UE. The signaled ZP CSI-RS may be muted or mapped to the PDSCH depending on to which UE the interference eNB schedules a PDSCH. Through such signaling, the target UE may be informed that the PDSCH may be mapped to the ZP CSI-RS or that the ZP CSI-RS may be muted. The UE is disabled to perform IC with respect to the corresponding REs using the ZP CSI-RS or is enabled to determine whether IC is performed with respect to the REs in the ZP CSI-RS via energy detection. Except for the signaled CRS index and CSI-RS index, unless there is separate signaling and restriction (e.g. PSS/SSS/PBCH transmission, positioning RS transmission, MBSFN subframe, etc.), the UE is informed that the PDSCH is transmitted in a region other than the signaled ZP CSI-RS. The UE, which has received this information, assumes that the PDSCH is transmitted in the region except for the ZP CSI-RS.

In general, the ZP CSI-RS is configured to cover a configured CSI-RS. Accordingly, as rate matching information of a separate interference signal, information indicating that the ZP CSI-RS covers the CSI-RS transmission location may be signaled to the UE without transmitting the CSI-RS information. That is, information indicating that the PDSCH may or may not be transmitted is included in the signaled ZP CSI-RS.

If the ZP CSI-RS of the interference is not separately signaled, the UE may consider that the PDSCH of the interference signal may not be mapped to one or a plurality of ZP CSI-RSs configured therefor and may not unconditionally perform IC with respect to the corresponding REs. Detailed ID operation of the corresponding REs follows UE implementation.

[PDSCH Starting Symbol Index]

When interference received from another eNB is cancelled, PDSCH starting symbols of an interference signal and a desired signal should be aligned between eNBs in advance. Cancellation of interference due to a CRS based PDCCH of a neighbor cell using a DM-RS based PDSCH is not preferable. Since the PDSCH starting OFDM symbol is changed according to the amount of control information transmitted via a PDCCH and load of a corresponding eNB in every subframe, dynamic signaling of the PDSCH starting symbol of the neighbor cell is very burdensome. Accordingly, the eNB may signal the PDSCH starting symbol index to the UE via semi-static signaling per DM-RS sequence. Here, the PDSCH starting symbol index means that the interference signal using the corresponding DM-RS sequence does not have a PDCCH of the interference signal after the signaled PDSCH starting symbol. For example, when the bit value is 0 in Table 6, PDSCH starting symbol index=2 is signaled, which means the PDCCH of the interference signal transmitted by the eNB using the DM-RS sequence corresponding to nVCID(0) is not transmitted after the signaled PDSCH starting symbol index=2. The UE is informed that PDCCH may be transmitted (the PDSCH may be transmitted) when the OFDM symbol index=0 or 1 but may not be transmitted when the OFDM symbol index≥2. Then, when the desired signal of the UE starts from the OFDM symbol index=1 and a signal using a DM-RS sequence having nVCID(0) as a seed value of the DM-RS sequence is received as strong interference, the UE may perform demodulation without performing IC with respect to the OFDM symbol index=1 and may perform IC and perform demodulation with respect to the subsequent OFDM symbol indices thereof. In other words, when the PDSCH starting symbol index information is received, the UE performs IC only in a region in which the PDSH is ensured to be transmitted and performs modulation without IC in the other region. At this time, a weight of the region in which modulation is performed without IC may be lowered to reduce loss.

As another embodiment of the present invention, the UE may assume that a PDSCH of a neighbor cell always starts after a symbol to which a PDSCH transmitted thereto is mapped, without separate signaling for the PDSCH starting symbol index shown in Table 6. eNBs should exchange information on the PDSCH starting symbol index in advance and, as described above, information indicating that the PDCCH is not transmitted after a specific OFDM symbol index should be exchanged along with subframe information (e.g., a subframe pattern) having valid information.

As another embodiment of the present invention, each eNB maximally conservatively assumes a PDSCH starting symbol index. The UE may assume that neighbor cells use a maximum number of OFDM symbols which may be used by a serving cell thereof for PDCCH transmission and perform IC for the PDSCH at subsequent symbols thereof. At this time, the UE assumes that bandwidths and frame structure types of the neighbor cells which interfere with the serving cell thereof are the same.

Similarly, coordination for transmission locations of the PDSCH and the EPDCCH may be exchanged between eNBs in advance. The EPDCCH may be demodulated using a DM-RS similarly to a PDSCH. In the EPDCCH, since control information of a maximum of four UEs may be multiplexed in one RB, it is difficult to perform interference cancellation in PRB units or bundled PRB units. Accordingly, when the UE cancels the interference signal in order to improve reception performance of the desired signal thereof, the UE assumes that a PDSCH of another UE or another layer is transmitted as the interference signal unless separate information is received and performs interference cancellation. A region in which the PDSCH is transmitted and a region in which the EPDCCH is transmitted are preset and information thereon is exchanged between eNBs in advance. In a specific frequency domain or a specific time-frequency domain, information indicating that the EPDCCH of the eNB is transmitted is exchanged.

2-1-1. Signaling Optimization

In case of fast backhaul link, the eNB may transmit, to the UE, information dynamically aiding interference cancellation in every subframe along with semi-static signaling. For example, even when the UE receives information on eight candidate seed values 1 to 8 of the sequence of an interference DM-RS, the number of candidates may be reduced by providing information indicating that only the seed values 2 to 4 are used via dynamic signaling. In some cases, the eNB may transmit only the seed value of one DM-RS sequence to the UE to accurately inform the UE of the DM-RS sequence of the interference signal. Alternatively, rank information (information on the number of layers of the interference signal) may be indicated via dynamic signaling. At this time, rank information signaled to the UE may be changed according to the number of layers of the interference signal which may be cancelled by the UE.

2-1-2. DM-RS Sequence Detection Procedure—Using Received Signal Power of RSs Used as QCL Assumption As another embodiment of the present invention, although the UE, which has received information on the interference signal shown in Table 6 above, may blindly detect the DM-RS sequence of the interference signal, the UE may use a CRS of a physical cell ID or a CSI-RS index which is signaled to be used as QCL assumption when the DM-RS sequence of the interference signal is detected. That is, using the CSI-RS or CRS as QCL assumption means the UE periodically or aperiodically measure the CSI-RS or CRS. At this time, only when the intensity of the received CSI-RS or CRS is equal to or greater than a predetermined level, it may be determined the DM-RS associated with the CSI-RS and the CRS may act as interference. Accordingly, the DM-RS acting as interference may be preferentially detected to estimate an interference channel and then IC may be performed.

2-1-3. PRB Bundling Alignment

When information aiding interference cancellation is received to cancel an interference signal from a received signal, PRB allocation of the interference signal should be additionally considered. A frequency domain occupied by a desired signal and a frequency domain occupied by an interference signal should be considered. That is, even when a DM-RS sequence for an interference signal is detected and interference is estimated using the DM-RS sequence, whether estimated interference can be cancelled with respect to all PRBs to which the desired signal is allocated should be considered.

For example, when the UE detects a DM-RS sequence A as an interference signal with respect to a specific interference signal A and cancels the interference signal from the received signal using the DM-RS sequence A, if the desired signal is allocated two consecutive PRBs and the interference signal A is allocated four consecutive PRBs, the UE cancels the interference signal from all PRBs allocated thereto. However, if the desired signal is allocated four consecutive PRBs and the interference signal A is allocated two consecutive PRBs, since it is not possible to ensure that the interference signal A is equally present in all the PRBs allocated to the UE without receiving information thereon, the UE may not cancel the interference signal.

Accordingly, unless resource allocation information of the interference is directly signaled, granularity for interference cancellation of the UE should be predetermined between eNBs and should be used for resource allocation of one UE. Preferably, a PRB bundling size and an interference cancellation unit should be the same. That is, on the assumption that the resource allocation of the serving cell is performed in PRB bundling units and resource allocation of the neighbor cell is performed in the same PRB bundling units, it is possible to cancel interference using allocated resources. In this case, the PRB bundling size and resource allocation unit should be predetermined between eNBs.

A specific RS sequence may assume PRB bundling and another RS sequence may not assume PRB bundling. In other words, whether PRB bundling is assumed per RS sequence is determined. That is, as shown in Table 6 above, when information on the DM-RS of the interference signal is provided, the eNB may signal information indicating whether PRB bundling is assumed per DM-RS sequence to the UE.

In order for the UE to perform interference cancellation in PRB bundling units, the channel of the interference signal is equally maintained within the bundled PRB. Accordingly, resource allocation in the bundled PRB is not of a distributed type but is of a localized type. The UE which knows such information may perform IC in a specific bundled PRB in which localized resource allocation is performed. The UE may not perform IC in a specific bundled PRB in which distributed resource allocation is performed. Accordingly, in resource allocation between eNBs, coordination between eNBs that distributed resource allocation is performed in a specific frequency domain and localized resource allocation is performed in a specific frequency domain is performed in advance.

In addition, a PRB bundling size may be changed. Resources may be allocated in a specific subframe in M PRB bundling units and may be allocated in another specific subframe in N PRB bundling units. Alternatively, resources may be allocated in a specific subframe in M PRB bundling units and may be allocated in another specific subframe in PRB units.

2-1-4. Heterogeneous Network (HetNet) Support

In a heterogeneous network (HetNet), when the information described in the present specification is provided to the UE in order to cancel the interference signal, additional information for interference cancellation may be provided. That is, when a macro eNB manages an almost blank subframe (ABS), a specific macro eNB may determine whether a PDSCH is transmitted according to an ABS pattern of the macro eNB. If the PDSCH is transmitted in the ABS with low transmit power, the signal is unlikely to be act as a dominant interference source of neighbor pico UEs. Accordingly, an interference candidate group shown in Table 6 above may be distributed and signaled to the UE according to the ABS pattern.

For example, the pico UE is informed of a plurality of subframe sets and an interference candidate group distributed to each subframe set. The interference candidate group means information shown in Table 6 above. The information shown in Table 6 above may be signaled per subframe set. Alternatively, the macro eNB may signal the information shown in Table 6 above with respect to the subframe set corresponding to the ABS only.

All or some of the information described in 2.1 and subsequent chapters thereof may be transmitted to the target UE.

2-2. Case in which Interference Signal is CRS Based Signal

If the interference signal is a CRS based PDSCH, information signaled by the network in order to enable the target UE to cancel the CRS based interference signal from the received signal will now be described. Since the interference signal is a CRS based PDSCH, a seed value of a CRS sequence is first obtained. This seed value is a physical cell ID of a cell for transmitting the CRS causing interference. Further, the UE needs to know a MBSFN subframe configuration in order to know the number of CRS ports, the locations of the CRS ports, information on presence/absence of the CRS, a transmission scheme in a subframe in which the CRS is not present and RS information.

Since transmit power of the CRS may be different from actual PDSCH transmit power, a ratio of PDSCH transmit power to the CRS transmit power needs to be signaled to the target UE. As the ratio of PDSCH transmit power to the CRS transmit power, both a ratio of a symbol on which the CRS is transmitted and a ratio of a symbol on which the CRS is not transmitted need to be signaled.

When the physical cell ID of the cell for transmitting the CRS, the number of CRS ports, the locations of the CRS ports and the information on presence/absence of the CRS are referred to as "CRS related information", the target UE may estimate an interference signal channel using the signaled CRS related information and determine whether CRS based PDSCH interference is present using the signaled ratio of PDSCH transmit power to the CRS transmit power.

If the interference signal is a CRS based PDSCH, the UE for cancelling the interference signal should know a transmitted precoding matrix index (TPMI) used to transmit the interference signal. However, it is difficult to provide the TPMI which is dynamically changed according to a channel state in every subframe. However, when the TPMI of a specific UE is fixed, performance of the UE may deteriorate. In addition, enabling the target UE to blindly detecting PMI which is actually used by the interference UE (that is, which is used to transmit the interference signal) among all PMI is burdensome. Accordingly, the PMI of the interference UE may be restricted to an extent that performance of the interference UE is not reduced.

A codebook subset may be restricted. For example, a specific UE may be enabled to use some of a total of 16 PMs for a report. In addition, such information may be delivered to the target UE such that the target UE blindly detects the TPMI with respect to the remaining PM(s) except for the PM, the use of which by the interference UE is restricted, (that is, the set of PMs which may be used by the interference UE) to cancel the interference signal.

That is, by providing codebook subset restriction information, the target UE is informed of the candidates of the TPMIs used by the interference UE. Accordingly, the rank of the interference UE may be restricted and, separately, rank restriction information of the interference UE (or the interference signal) may be explicitly provided. The rank restriction information, the PDSCH starting symbol index, the modulation order (or the MCS level) restriction information and HetNet support are equal to those of the DM-RS based signal of 2-1.

Additionally, even when the interference signal is a CRS based PDSCH, transmission mode (TM) information of the dominant interference UE may also be delivered for the purpose of indicating the PDSCH transmission method.

Next, information which may be signaled to the target UE when the interference signal is a CRS based signal will be described.

TABLE 8

| | | | CRS information | | | | | |
|---|---|---|---|---|---|---|---|---|
| Bit value | TM (Transmission Mode) of interfering UE | PCID (Physical Cell ID) | CRS information (CRSPortsNumber, FrequencyShift, MBSFNsubframe pattern) | CRS to PDSCH power ratio | TPMI or codebook subset restriction | Rank Restriction | PDSCH starting Symbol index | Modulation order restriction |
| 0 | TM2 | PCID (0) | _PortNum0, _Freqshift0, _MBSFN_subframe_0 | $-\rho_A(0)$, $\rho_B(0)$, | | | 2 | — |
| 1 | TM3 | PCID (1) | _PortNum1, _Freqshift1, _MBSFN_subframe_1 | $\rho_A(1)$, $\rho_B(1)$, | 01 | 1 | 1 | 2 |
| 2 | TM4 | PCID (2) | _PortNum1, _Freqshift1, _MBSFN_subframe_1 | $\rho_A(2)$, $\rho_B(2)$, | 0000 . . . 1111 | 2 | 3 | 4 |
| . . . | | | | | | | | |

2-2-1. CRS Sequence Detection Procedure

Even when the CRS based interference signal is cancelled, the UE should measure and monitor the CRS of a neighbor cell for a long term. As shown in Table 8 above, when detecting the CRS based interference signal, the UE, which has received the CRS-related information of a specific cell, may determine that the PDSCH using the CRS is received as interference only when the intensity of the received CRS based signal is equal to or greater than a predetermined level and perform channel estimation and cancellation of the interference signal using the received CRS based signal, the intensity of which is equal to or greater than the predetermined level, only.

2-2-2. Subband Size Alignment

When information aiding interference cancellation is received to cancel the interference signal, subband size alignment of the interference signal should be further considered. A frequency domain to which a desired signal is allocated and a frequency domain to which an interference signal is allocated need to be considered. Unless resource allocation information of the interference signal is directly indicated, granularity for interference cancellation of the target UE should be predetermined between eNBs and should be used for resource allocation of one UE.

In addition, when the CRS based PDSCH interference is cancelled, the TPMI of the interference signal should not be changed in the unit of the frequency domain in which the target UE cancels interference. Preferably, the subband size used for CQI report by the target UE and the size of the frequency domain in which interference cancellation will be performed should be the same. That is, the PMI is determined in subband units when the serving cell allocates resources to the target UE and the unit in which the PMI is equally maintained when the neighbor cell allocates resources to the interference UE should be determined to the subband. Accordingly, on the premise that the subband size of the target UE and the subband size of the interference UE are the same, the target UE may perform interference cancellation in the frequency domain allocated thereto. In this case, the subband size and resource allocation should be predetermined between eNBs.

Similarly, PRB grouping is possible as a unit in which the TPMI is equally maintained. Within PRB grouping, the TPMI of the interference UE and the TPMI of the target UE are equally maintained. Information indicating how many PRBs are grouped and used for this purpose is also predetermined between eNBs.

All or some of the information described in 2.1 and subsequent chapters thereof may be transmitted to the target UE.

2-3. Case in which DM-RS Based Signal and the CRS Based Signal are Mixed

Practically, in the interference signals of the target UE, the DM-RS based PDSCH and the CRS based PDSCH are mixed. In order to cancel the interference signal from the received signal, the target UE should determine whether the signal is a DM-RS based PDSCH or a CRS based PDSCH, estimate the amount of interference in the received signal based on the determination, and cancel interference from the received signal.

Accordingly, when the DM-RS based PDSCH and the CRS based PDSCH are mixed, information provided by the network and UE operation will be described. Table 9 below includes the information described in Tables 6 and 8 above and, for a description thereof, refer to Tables 6 and 8 above.

TABLE 9

| Bit value | TM (Transmission Mode) of interfering UE | CRS information | | | | | DM-RS information | |
|---|---|---|---|---|---|---|---|---|
| | | PCID (Physical Cell ID) | CRS information (CRSPortsNumber, FrequencyShift, MBSFNsubframe pattern) | CRS to PDSCH power ratio | TPMI or codebook subset restriction | Rank Restriction | VCID (virtual cell ID) ∈ {0, 1, 2, ..., 503} | nSCID ∈{0, 1} |
| 0 | TM 4 | PCID (0) | _PortNum0, _Freqshift0, _MBSFN_subframe_0 | $\rho_A(0)$, $\rho_B(0)$, | 0000 ... 1111 | 2 | — | |
| 1 | TM 10 | | _PortNum1, _Freqshift1, _MBSFN_subframe_1 | $\rho_A(1)$, $\rho_B(1)$, | — | 4 | nVCID (1) | {0} |
| 2 | TM 10 | PCID (2) | _PortNum2, _Freqshift2, _MBSFN_subframe_2 | $\rho_A(2)$, $\rho_B(2)$ | | | nVCID (2) | {0} |
| ... | | | | | | | ... | ... |

| Bit value | QCL assumption (non-zero power) CSI-RS index | PCID (Physical Cell ID) | NZP CSI-RS index | ZP CSI-RS index | Rate-matching information CRS information (CRSPortsNumber, FrequencyShift, MBSFNsubframe pattern) | PDSCH starting Symbol index | Modulation order restriction |
|---|---|---|---|---|---|---|---|
| 0 | — | nPCID (0) | — | — | PortNum0, Freqshift0, MBSFN_subframe_0 | 2 | — |
| 1 | qcl-CSI-RS index (1) | | CSI-RS (1) | ZP CSI-RS (1) | PortNum1, Freqshift1, MBSFN_subframe_1 | 1 | 2 |

TABLE 9-continued

| 2 | nPCID (2) | PortNum2, Freqshift2, MBSFN_subframe_2 | 3 | 4 |
|---|---|---|---|---|
| ... | ... | ... | | |

In Table 9, information provided to the target UE when it is not determined which RS is used to modulate the interference signal is shown. First, the eNB signals information indicating whether the interference signal is a CRS based PDSCH or a DM-RS based PDSCH using a signaled TM. The transmission method of the interference signal may be identified according to the signaled TM.

In the CRS based TM (e.g., TM 4), the eNB provides CRS related information. At this time, DM-RS related information is not provided. That is, in the CRS based TM, QCL assumption is not necessary and thus may be omitted.

In the DM-RS based TM (e.g., TM 10), the eNB may provide DM-RS related information as well as CRS related information.

When the target UE receives the information shown in Table 9 and cancels the interference signal, since the CRS is always transmitted regardless of transmission of the PDSCH, the target UE assumes that the DM-RS based PDSCH is present using the given TM and blindly detects the DM-RS sequence. Thereafter, if it is determined that the DM-RS interference signal is not present or after the DM-RS based interference signal is cancelled, the CRS based interference signal is estimated.

Third Embodiment—Method for Reflecting Interference Capability of UE in CSI Feedback First of all, in case of single cell/multi-cell MU-MIMO as shown in (c) and (d) of FIG. 5, if a target UE can identify information on an interference signal and cancel such interference, the capability of the UE should be reflected in CSI (Channel State Information) report of the UE.

If the target UE can cancel the interference signal, since received SINR of the corresponding UE can be improved as much as interference that can be canceled by the corresponding UE and an optimal beam direction may also be varied, the target UE may receive and decode a target (or desired) PDSCH even though the target PDSCH (or desired PDSCH) is transmitted at a modulation order and a code rate, which are higher than those before interference is cancelled/mitigated, in a better beam direction. Therefore, if the target UE has a capability capable of canceling the interference signal, it is preferable that the UE reports CSI that has reflected the capability. The present invention suggests a method for reflecting a capability capable of canceling an interference signal in CSI report when a UE has the capability. The CSI report relates to a channel state of a UE, which is reported to a network by the UE, and includes CQI, PMI, RI, etc. When the UE measures CSI, the UE measures a target channel and an interference channel, which are headed thereto, and determines received CQI/PMI/RI based on the measured target channel and interference channel and reports the determined result to the network. Examples of a reference signal for measurement of the target channel include a CRS and a CSI-RS in the current 3GPP LTE/LTE-A system and an evolved system. Also, there are a CRS and a CSI-IM (Channel State Information—Interference Measurement) resource for measuring the interference channel.

That is, in measuring the CSI, in transmission modes (TMs) 1 to 8, the target channel and the interference channel are measured using the CRS. A UE of a TM 9 measures the target channel using the CSI-RS, and measures the interference channel using the CRS. A UE set to a TM 10 measures the target channel using the CSI-RS, and measures the interference channel using the CSI-IM.

This embodiment suggests a method for reflecting an interference cancellation capability of a UE receiver in CSI report. This method relates to a method for performing CSI measurement by reflecting canceled interference because residual interference after interference cancellation is reduced after the UE cancels interference. Therefore, this embodiment respectively suggests a method for reflecting an interference cancellation capability of a UE in CSI if interference measurement is performed using the CRS and a method for reflecting an interference cancellation capability of a UE in CSI if interference measurement is performed using the CSI-IM resource.

In the methods suggested in this embodiment, channel estimation for the interference signal is basically performed using an RS of the interference signal, and the channel estimated interference signal is canceled from all received signals. Therefore, the UE should receive basic information on a set of dominant interference sources from the network, and should perform channel estimation for the interference signal by using the received information. Examples of the information on the dominant interference sources that should be transferred from the network to the UE may include information corresponding to a seed of RS sequence, transmission mode (TM), PDSCH start symbol index, QCL information and rate-matching information in case of DM-RS based interference, and information on TPMI, a modulation order and rank in case of CRS based interference. Details of the method for estimating and canceling the interference signal to improve received performance of a magnetic signal after the UE receives the above information have been described in the aforementioned embodiment. In this specification, the basic information provided by the network to cancel interference of the UE in the aforementioned embodiments may be referred to as interference cancellation information.

This embodiment relates to a method for reflecting an interference cancellation capability of the UE at a subframe for measuring CSI for CSI feedback not a method for canceling interference at a subframe at which a PDSCH is scheduled to the UE. At this time, in order to cancel interference at the subframe at which the PDSCH is scheduled to the UE, information provided by the network may be used for CSI measurement. That is, an RS of an interference UE is blind-detected using the given information, and channel estimation for the interference signal is performed using the detected RS, whereby the estimated interference channel is extracted from all the measured interferences.

When the UE has an interference cancellation capability, the network may command the UE whether to perform feedback of CSI in which the interference cancellation capability of the UE is reflected or CSI in which the interference cancellation capability is not reflected. That is, the UE may not cancel the interference signal at the step of receiving a PDSCH due to various restrictions even though the UE has the interference cancellation capability. Therefore, in this case, when the UE feeds back CSI, feedback of CSI after the UE cancels dominant interference may deteriorate performance of the corresponding UE. Therefore, when the network reports CSI to the corresponding UE, the network should command the UE whether to report CSI after canceling interference or report CSI in a state that interference is not canceled. In this case, the various restrictions may include a case where an operation such as estimation of the interference signal cannot be performed due to a too great timing advance (TA) value of a specific UE at the time when the PDSCH is received, and a case where the corresponding UE cannot perform an operation such as demodulation and estimation for the interference signal as a target PDSCH is transmitted using all supportable layers.

As another embodiment, the network may command the corresponding UE to report CSI from which interference is canceled, CSI from which interference is not canceled, or may command the corresponding UE to report both CSIs. When the network commands the UE to report these two kinds of CSIs, an eNB should allocate a CSI feedback resource required for report of each CSI.

3-1. Method for Reflecting Interference Capability of UE at CRS Based Interference Measurement During CSI Report Except a TM 10 defined in the legacy 3GPP LTE/LTE-A system, a UE set to TM1 to TM9 measures interference based on the CRS when measuring interference for CSI feedback. If a CRS received signal of a serving eNB is extracted from all received signals at a location (REs), to which a CRS of a serving eNB of the UE is transmitted, by using CRS sequence of a serving eNB which is already known, the corresponding signal becomes the amount of interference and noise at the corresponding location. As a result, the UE set to TM 1 to TM 8 may obtain a received SINR value by using the CRS of its serving eNB, whereby CSI feedback may be performed. The UE uses the CSI-RS for measurement of a magnetic signal S (signal scheduled to the UE) in case of TM9, and obtains received SINR for the other I+N (interference and noise) by using the CRS of the serving eNB, whereby CSI feedback is performed.

For convenience of description, the other interference and noise except the magnetic signal S is supposed as I. Then, the magnetic signal is extracted from all received signals by using the CRS of the serving eNB of the UE, whereby the following Equation is obtained.

$$I_{total}[i,j]=R_{received}[i,j]-S_{target}[i,j]$$ [Equation 1]

In this case, i, j is [symbol, RE] index to which serving cell CRS ports are mapped. $R_{received}[i,j]$ is a whole signal power received at the location (RE) to which the CRS is transmitted, and $S_{target}[i,j]$ is a CRS received signal power of the serving eNB at the corresponding location. Also, $I_{total}[i,j]$ is the other signal intensity obtained by subtracting the CRS received signal power of the serving eNB from the whole received signal power. Reflecting an interference cancellation capability of the target UE in CSI means that CSI is calculated using interference remaining after a dominant interference signal power is canceled from $I_{total}[i,j]$, and then is fed back.

When the UE actually performs CSI feedback, CSI is calculated by obtaining an average of the Equation 1 within a time and frequency domain determined in accordance with CSI feedback configuration, and then is fed back. The number of subbands for CSI feedback of the corresponding UE is m, and average values of $I_{total}[i,j]$ and $S_{target}[i,j]$ within the time and frequency domain (subband or full band) are respectively $I_{total}[m]$ and $S_{target}[m]$ (in this case, m is a subband index), and $I_{report}[m]$ used for CSI calculation after interference of a specific dominant interference source is canceled is as follows.

$$I_{report}[m]=I_{total}[m]-I_{cancelled}[mj]$$ [Equation 2]

Therefore, when the target UE calculates CSI, $S_{target}[m]/I_{report}[m]=S_{target}[m]/(I_{total}[m]-I_{cancelled}[m])$ not $S_{target}[m]/I_{total}[m]$ is used as a received SINR value. In this case, $I_{total}[m]$ may be used as an average value for $I_{total}[i,j]$ over a full band to improve estimation performance, and in this case, may be expressed as $I_{total}$.

At this time, signaling and method required to detect a dominant interference source and perform channel estimation for an interference signal are similar to the aforementioned method for performing interference cancellation in a target UE to improve PDSCH received performance. The dominant interference source may be detected semi-blindly by using the aforementioned information on dominant interference source candidates. If there is no separate signaling for the dominant interference source candidates, the UE blindly detects an interference source within its capability range. Then, the UE performs channel estimation for the interference signal by using the detected RS, and extracts the channel estimated result from interference measured at the location (RE) to which the CRS of the serving eNB is transmitted and then calculates/reports CSI. The UE should know CRS based interference or DM-RS based interference even when detecting the dominant interference source, and performs estimation for the interference channel by using the detected RS.

If the CRS of the serving eNB is overlapped with a location to which a CRS of a specific eNB is transmitted (colliding CRS), and if a power of a received signal of the overlapped CRS is a certain level or more, the UE extracts a CRS received power of its serving eNB from the whole received signal, and determines whether there is a PDSCH transmitted from the corresponding eNB, in a PDSCH region in addition to a resource to which the CRS is transmitted, by using the overlapped CRS received signal power value. At this time, the aforementioned signaling and interference cancellation method required to cancel CRS based PDSCH interference are used.

If it is determined that the corresponding interference CRS based PDSCH is not transmitted, the UE calculates CSI after extracting the corresponding CRS received power, that is, a received power of a CRS of a specific eNB, from $I_{total}[m]$ and feeds back the calculated CSI. If it is determined that the corresponding interference CRS based PDSCH is transmitted, the UE performs channel estimation of the corresponding interference PDSCH, extracts a power equivalent to the estimated value from $I_{total}[m]$, calculates CSI, and then reports the calculated CSI.

3.2 Method for Reflecting Interference Cancellation Capability of UE at CSI-IM Resource Based Interference Measurement During CSI Report CSI-IM is a partial resource of resources set to ZP (zero-power) CSI-RS, and refers to a resource for allowing a UE to measure interference at the corresponding resource.

In more detail, for a serving eNB and a UE, which are set to a TM 10, the UE may be configured by one or more CSI-IM resource configuration(s). Two parameters may be configured for each CSI-IM resource configuration through higher layer signaling, and their examples include a zero-power CSI RS configuration and zero-power CSI-RS subframe configuration. The UE is not expected to receive CSI-IM resource configuration(s) which is(are) not fully overlapped with one zero-power CSI-RS resource configuration that may be configured for the UE. Also, the UE is not expected to receive CSI-IM resource configuration which is not fully overlapped with one of zero-power CSI-RS resource configurations. The UE should not expect configuration of CSI-IM resource and PMCH at the same subframe of the serving eNB.

The zero-power CSI RS resource will be described in more detail. For a serving eNB and a UE, which are set to TMs 1 to 9, the UE may be configured by one zero-power CSI-RS resource configuration. For a serving eNB and a UE, which are set to a TM 10, the UE may be configured by one or more zero-power CSI-RS resource configuration(s). The following parameters may be configured for one or more zero-power CSI-RS resource configuration(s) through higher layer signaling.

list of zero-power CSI RS configurations
zero-power CSI RS subframe configuration When a specific UE is allowed to measure interference at a specific CSI-IM resource location, a PDSCH to the corresponding UE may be mapped into the corresponding CSI-IM or not. Hereinafter, when the UE measures interference at the CSI-IM resource, it is assumed that a PDSCH scheduled to the UE is not mapped into the corresponding resource. If the PDSCH of the UE is mapped into the corresponding resource, the operation after the UE extracts a magnetic signal will be described.

Basically, the network notifies the UE of a plurality of CSI-IM resource configurations, and performs rate-matching for a PDSCH of a specific dominant interference source per corresponding CSI-IM resource and transmits the rate-matched result, whereby the UE may report CSI by regarding that there is no interference of a specific dominant interference source at a specific CSI-IM resource. However, if the number of dominant interference sources is increased and the number of UEs which desire to cancel interference is increased, a problem occurs in that it is difficult to manage the dominant interference sources and the UEs in view of a whole network.

The UE measures interference occurring in the CSI-IM resource, and it is assumed that the measured interference is $I_{total}$. In order to identify eNBs that cause interference and how much interference is, the UE primarily performs (semi-)blind detection for RS sequence by using information on dominant interference sources received through a higher layer signal, and performs channel estimation for the interference signal by using the detected RS. And, the UE extracts a value equivalent to a channel value of the estimated interference signal from $I_{total}$, and uses the extracted value for CSI feedback. That is, if the channel value of the interference signals estimated and extracted by the UE is $I_{cancelled}$, interference actually used by the UE for CSI report is $I_{report} = I_{total} - I_{cancelled}$, whereby interference becomes smaller than the time before interference is extracted, and thus high CQI report may be performed.

When the UE performs channel estimation for the interference signal by using transmission RS information of eNBs, which may act as interference, the UE should determine CRS based interference or DM-RS based interference.

When the UE desires to detect the interference signal by assuming DM-RS based interference, if there is PRB bundling information on a specific DM-RS and the UE may assume PRB bundling information, the UE performs detection of DM-RS sequence in a unit of PRB bundling. If a specific DM-RS sequence is detected, the UE may cancel a channel value estimated from the corresponding bundled PRB, from interference measured in a CSI-IM resource within the corresponding bundled PRB. In this case, the unit of interference cancellation of the UE is a PRB bundling unit. The unit of measuring and canceling the interference signal in the UE is PRB bundling unit, and an average value for the CSI-IM resources distributed over a full band may be used for interference measured through the CSI-IM resources.

$$I_{report}[k] = I_{total} - I_{cancelled}[k] \quad \text{[Equation 3]}$$

In this case, k=1, 2, . . . , N, where N is a total number of bundled PRBs.

In this case, the PRB bundling unit means a basic unit for allocating a PDSCH from an eNB to a UE, and the same precoding and DM-RS sequence are used within the corresponding bundled PRB. And, the PRB bundling unit means that this information is exchanged between eNBs and the eNBs cooperate with each other to allocate the information on a PRB bundling size and frequency axis. As a result, interference cancellation based on DM-RS sequence can be performed.

When the UE desires to detect the interference signal by assuming CRS based interference, information on a subband size is required similarly to the DM-RS. Assumptions about TPMI of the interference signal, which is varied in a unit of PRB subband size, and about TPMI of the interference signal, which is not varied within the corresponding subband, are required. The UE performs detection of CRS sequence by given CRS sequence information and performs channel estimation by using the detected CRS. The UE detects whether there is a PDSCH transmitted based on the corresponding CRS, in a PDSCH region, by using the estimated channel value and a CRS-to-PDSCH EPRE (energy per resource element) value of the corresponding CRS. If it is determined that there is a PDSCH based on the corresponding CRS, the UE removes the estimated channel value from the measured interference, and uses the removed channel value for CSI feedback.

$$I_{report}[m] = I_{total} - I_{cancelled}[m] \quad \text{[Equation 4]}$$

In this case, m=1, 2, . . . , L, where L is a total number of subbands.

In this case, each of the unit of detecting and estimating the interference signal in the UE and the unit of canceling interference is a subband size unit. An average value for the CSI-IM resources distributed over a full band may be used for interference measured through the CSI-IM resources.

Meanwhile, when interference is measured using the CSI-IM resources, the network should notify the UE that a PDSCH corresponding to a specific RS sequence is transmitted to a specific CSI-IM resource. That is, although a PDSCH (or PDSCH of a specific eNB) corresponding to a specific RS sequence is transmitted to the CSI-IM resource by muting due to CoMP scheme, the PDSCH (or PDSCH of a specific eNB) corresponding to the corresponding RS sequence may be transmitted to a PDSCH region other than the corresponding CSI-IM resource. If there is no separate signaling, the UE recognizes interference measured from the corresponding CSI-IM resource as $I_{total}[\bullet]$, and recognizes a value equivalent to channel estimation for the aforementioned interference signal as the amount of interference that may be canceled by itself. As a result, the UE may extract the PDSCH from $I_{total}[\bullet]$, whereby inexactness of CSI feedback is increased. In this case, since there is no interference due to the PDSCH (or PDSCH of a specific eNB) corresponding to the corresponding RS sequence in the CSI-IM resource, it is preferable that the UE does not extract the PDSCH from $I_{total}[\bullet]$ even though the PDSCH (or PDSCH of a specific eNB) corresponding to the corresponding RS sequence is detected from the PDSCH as a dominant interference source. Therefore, when interference is measured using the CSI-IM resource, the network should notify the UE whether the PDSCH (or PDSCH of a specific eNB) corresponding to a specific RS sequence is muted to a specific CSI-IM resource.

When the network desires to notify that the PDSCH (or PDSCH of a specific eNB) corresponding to a specific RS sequence is muted to a specific CSI-IM resource, if an eNB configures different environments where properties of interference acting on a UE are different from each other, for example, if ABS is managed, the eNB may configure a plurality of subframe subsets having their respective interference properties different from each other. In this case, the network should notify whether the PDSCH (or PDSCH of a specific eNB) corresponding to a specific RS sequence is muted to a specific CSI-IM resource, per subset of each subframe.

Fourth Embodiment—Signaling Whether UE Performs Interference Cancellation and Whether to Reflect Interference Cancellation Capability in CSI Feedback and UE Operation Based on the Signaling When interference is measured using CSI-IM resources, the network should notify the UE whether interference is caused as a PDSCH corresponding to RS sequence transmitted from a specific eNB or TP is transmitted to a specific CSI-IM resource. Alternatively, when interference is measured using CSI-IM resources, the network may notify the UE whether interference may be caused as a CRS-based PDSCH transmitted from a specific eNB or TP is transmitted to each CSI-IM resource or whether interference may be caused as a DM-RS based PDSCH is transmitted to each CSI-IM resource.

The eNB notifies the UE whether a corresponding neighboring eNB may transmit a PDSCH of a random transmission mode, while notifying the UE of cell ID of the neighboring eNB, whereby the UE may determine whether an interference signal is transmitted from the corresponding neighboring eNB during its data reception and receive its data signal by canceling the corresponding interference signal.

Similarly, the eNB notifies the UE whether a corresponding neighboring eNB may transmit a PDSCH of a random transmission mode to a CSI-IM resource, while notifying the UE of cell ID of the neighboring eNB, whereby the UE may determine whether an interference signal is transmitted from the corresponding neighboring eNB when the UE measures interference in CSI-IM resources, and measures interference in CSI-IM resource by canceling the corresponding interference signal if there is the corresponding interference signal. On the other hand, the eNB notifies the UE whether a corresponding neighboring eNB may not transmit a PDSCH of a specific transmission mode to a CSI-IM resource, while notifying the UE of cell ID of the neighboring eNB, whereby the UE may measure interference in CSI-IM without canceling an interference signal from the corresponding neighboring eNB.

Alternatively, the eNB may notify the UE of zero power (ZP)-CSI-RS configuration considered when the corresponding PDSCH is mapped into RE, that is, ZP-CSI-RS configuration of the specific eNB or TP (that is, neighboring cell not serving cell of the UE).

The UE compares a location of the ZP-CSI-RS considered during PDSCH transmission from a specific eNB or TP with a location of the CSI-IM of the serving cell, and determines there is no interference from the PDSCH transmitted from the specific eNB or TP in the corresponding CSI-IM resource and does not perform interference cancellation for the PDSCH transmitted from the specific eNB or TP if the locations are the same as each other. By contrast, the UE compares a location of the ZP-CSI-RS considered during PDSCH transmission from a specific eNB or TP with a location of the CSI-IM, and if the locations are different from each other, there may be interference in the corresponding CSI-IM resource due to the PDSCH transmitted from the specific eNB or TP. Therefore, the UE detects whether there is an interference signal, and reports CSI by performing interference cancellation for the PDSCH transmitted from the specific eNB or TP if there is the interference signal.

Meanwhile, if the UE is allocated with a plurality of CSI processes, UE complexity becomes too great to reflect the interference cancellation capability in each CSI process and report CSI. To lower such complexity, the following methods are suggested.

As the first method, when the network configures a CSI process for CSI report, for the UE, the network designates whether to report CSI in which interference cancellation is reflected per CSI process or CSI from which interference is not canceled. Alternatively, when the network configures a CSI process for CSI report, for the corresponding UE, the network designates whether to report CSI in which interference cancellation is reflected with respect to a CSI process including a corresponding CSI-IM per CSI-IM or CSI from which interference is not canceled.

As the second method, the UE determines whether to reflect interference cancellation of the UE in CSI report depending on the number of CSI processes or the number of CSI-IMs, which is configured for CSI report.

As a representative embodiment, the UE reflects its interference cancellation capability in CSI report if the number of CSI processes configured for CSI report is one, whereas the UE does not reflect its interference cancellation capability in CSI report if the number of CSI processes configured for CSI report exceeds one.

As another embodiment, the UE reflects its interference cancellation capability in CSI report if the number of CSI processes configured for CSI report is one, whereas the UE does not reflect its interference cancellation capability in CSI report if the number of CSI-IMs constituting CSI processes configured for CSI report exceeds one. That is, if two CSI processes are configured and CSI-IM used to define a CSI process 1 is the same as CSI-IM used to define a CSI process 2, the UE reflects its interference cancellation capability in CSI report. If the CSI-IM used to define a CSI process 1 is different from the CSI-IM used to define a CSI process 2, the UE does not reflect its interference cancellation capability in CSI report.

As a modified embodiment of the first method, a method for designating whether to reflect the interference cancellation capability in CSI report per CSI process can identify a gain level for the interference cancellation capability of the UE through a difference between two CSI reports by allowing an eNB to configure a CSI process 0 comprised of CSI-RS0 and CSI-IM0 and a CSI process 1 comprised of CSI-RS0 and CSI-IM0, designate that the interference cancellation capability is reflected in CSI report with respect to the CSI process 0 and designate that the interference cancellation capability is not reflected in CSI report with respect to the CSI process 1.

As another modified embodiment, the UE determines whether to reflect the interference cancellation capability of the UE in CSI report depending on ID of the CSI process configured for CSI report or CSI-IM ID.

As a representative embodiment, with respect to the CSI process configured for CSI report, the UE reflects its interference cancellation capability in CSI report if ID of the corresponding CSI process is "0(zero)", whereas the UE does not reflect its interference cancellation capability in CSI report if ID of the corresponding CSI process is not "0". In more detail, the UE reflects its interference cancellation capability in CSI report if ID of the corresponding CSI process is "N" or smaller than "N", whereas the UE does not reflect its interference cancellation capability in CSI report if ID of the corresponding CSI process is greater than "N".

As another embodiment, with respect to CSI-IM constituting a CSI process configured for CSI report, the UE reflects its interference cancellation capability in CSI report if ID of the CSI-IM constituting the corresponding CSI process is "0(zero)", whereas the UE does not reflect its interference cancellation capability in CSI report if ID of the CSI-IM constituting the corresponding CSI process is not "0". In more detail, the UE reflects its interference cancellation capability in CSI report if ID of the CSI-IM constituting the corresponding CSI process is "N" or smaller than "N", whereas the UE does not reflect its interference cancellation capability in CSI report if ID of the CSI-IM constituting the corresponding CSI process is greater than "N". In this case, N may be determined by UE capability which will be described below.

In reporting a UE capability for NAICS capability, the UE reports how many CSI processes or CSI-IMs may be used to reflect the interference cancellation capability in CSI report.

The UE reports a UE capability for the number of CSI processes, which can be supported per band or per band per band combination.

In this case, the band means a frequency band where the UE performs transmission and reception operations, and carrier aggregation can be performed within each band or between bands.

In this case, in the suggested method, the number of maximum CSI processes which can be supported per band per band combination is reported and at the same time UE capability as to how many CSI processes can reflect interference cancellation is reported. Alternatively, the number of maximum CSI processes which can be supported per band is reported and at the same time UE capability as to how many CSI-IMs can reflect interference cancellation is reported.

If it is reported that the UE has NAICS capability without detailed report of UE capability as to whether the interference cancellation capability for the CSI process can be reflected, the corresponding UE reflects its interference cancellation capability in CSI report in a PDSCH transmission scheme of TM1 to TM9, which performs CRS based interference measurement, and does not reflect its interference cancellation capability in CSI report in a PDSCH transmission scheme of TM10, which performs CSI-IM resource based interference measurement.

Figure 6:
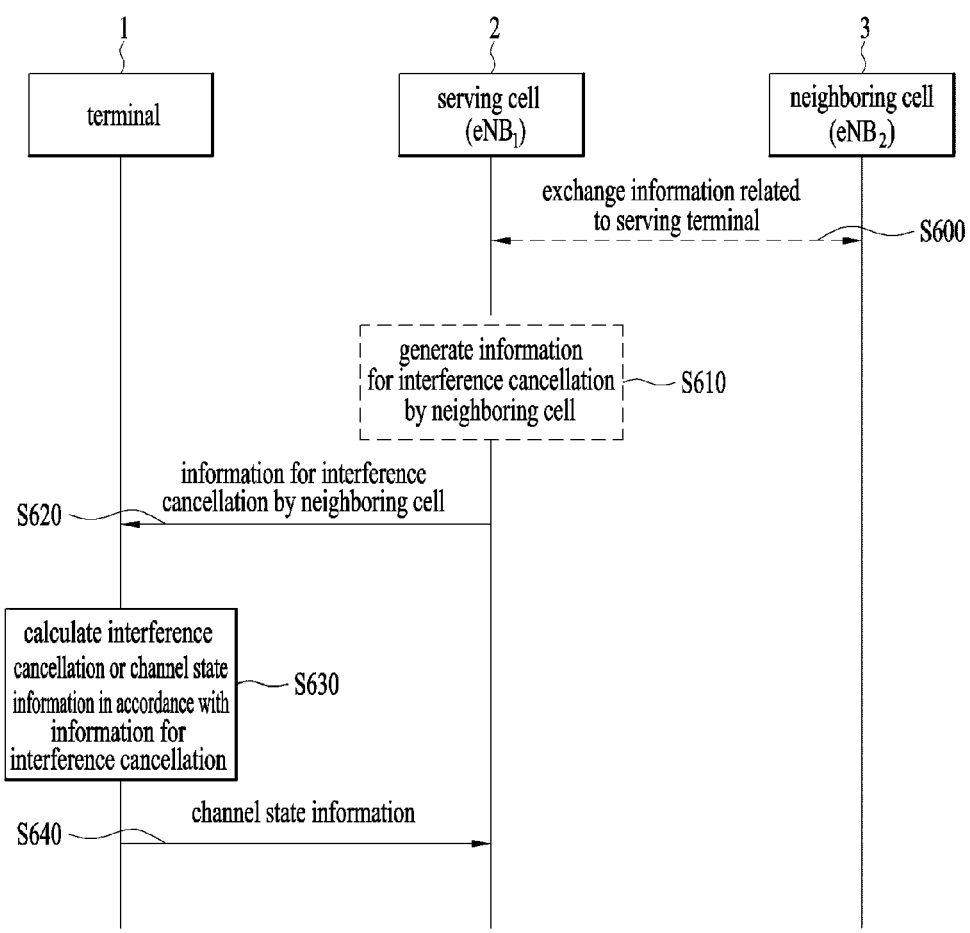
FIG. 6 is a diagram showing operation according to one embodiment of the present invention.

FIG. 6 illustrates an operation according to one embodiment of the present invention.

Referring to FIG. 6, it is assumed that a terminal 1 has an interference cancellation capability. A serving cell 2 and a neighboring cell 3 can exchange information related to a serving terminal with each other (S600). The information related to the serving terminal may include every kind of information related to a terminal served by the above cells or every kind of information configured for the terminal. However, every kind of information should not be necessarily exchanged as information for interference cancellation. The serving cell may configure or generate information for interference cancellation by the neighboring cell by selecting information required for interference cancellation of the terminal from the information related to the serving terminal of the neighboring cell (S610).

The terminal may receive the information for interference cancellation by the neighboring cell from the serving cell (S620). The terminal may calculate the interference cancellation or the channel state information in accordance with the received information for interference cancellation (S630). Then, the terminal may transmit the calculated channel state information to the serving cell (S640).

In this case, the information for interference cancellation may include indicating whether interference exists by means of a transmission signal of the neighboring signal in the CSI-IM resource of the serving cell.

Also, the information for interference cancellation may include ID (identifier) of the neighboring cell and a transmission mode related to the transmission signal.

Also, the information for interference cancellation may include zero-power channel state information-reference signal (CSI-RS) configuration of the neighboring cell. Meanwhile, if a resource indicated by the zero-power CSI-RS configuration of the neighboring cell is the same as the CSI-IM resource of the serving cell, the terminal does not perform the interference cancellation in the CSI-IM resource, and if the resource indicated by the zero-power CSI-RS configuration of the neighboring cell is the same as the CSI-IM resource of the serving cell, the terminal may perform the interference cancellation in the CSI-IM resource.

The terminal may calculate the channel state information depending on whether the interference cancellation is reflected in calculation of the channel state information designated per CSI process configured for the terminal or per CSI-IM constituting the CSI process.

The terminal may calculate the channel state information depending on the number of CSI processes configured for the terminal or the number of CSI-IMs constituting the CSI process. Also, if the number of CSI processes or the number of CSI-IMs constituting the CSI process is N (N is an integer greater than 1) or less, the interference cancellation may be reflected in calculation of the channel state information, and if the number of CSI processes or the number of CSI-IMs constituting the CSI process exceeds N, the interference cancellation may not be reflected in calculation of the channel state information.

The terminal may calculate the channel state information in accordance with ID (identifier) of the CSI process configured for the terminal or CSI-IM constituting the CSI process. If ID of the CSI process or CSI-IM constituting the CSI process is N (N is an integer greater than 1) or less, the interference cancellation may be reflected in calculation of the channel state information, and if ID of the CSI process or CSI-IM constituting the CSI process exceeds N, the interference cancellation may not be reflected in calculation of the channel state information.

Although the embodiments according to the present invention have been briefly described with reference to FIG. 6, the embodiment related to FIG. 6 may alternatively or additionally include at least a part of the aforementioned embodiment(s).

Figure 7:
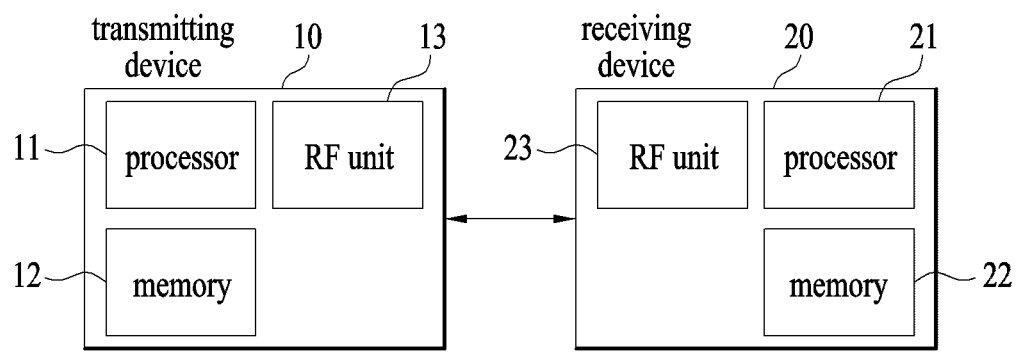
FIG. 7 is a block diagram of an apparatus for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), relay, or base station (BS).

The invention claimed is:

1. A method for reporting channel state information (CSI) by a terminal having an interference cancellation capability in a wireless communication system, the method comprising:
   receiving, from a serving cell, information for cancellation of interference from a neighboring cell, the information including a CSI-interference measurement (IM) resource of the serving cell;
   calculating the channel state information in accordance with the received information; and
   transmitting the calculated channel state to the serving cell,
   wherein the received information includes information indicating whether interference by a transmission signal of the neighboring cell exists in the CSI-IM resource of the serving cell.

2. The method according to claim 1, wherein the received information includes a cell ID (identifier) of the neighboring cell and a transmission mode related to the transmission signal.

3. The method according to claim 1, wherein the received information includes a zero-power channel state information-reference signal (CSI-RS) configuration of the neighboring cell.

4. The method according to claim 3, wherein, if a resource indicated by the zero-power CSI-RS configuration of the neighboring cell is the same as the CSI-IM resource of the serving cell, the terminal does not perform the interference cancellation in the CSI-IM resource, and if the resource indicated by the zero-power CSI-RS configuration of the neighboring cell is the same as the CSI-IM resource of the serving cell, the terminal performs the interference cancellation in the CSI-IM resource.

5. The method according to claim 1, wherein the calculating the channel state information includes calculating the channel state information depending on whether the interference cancellation is reflected in calculation of the channel state information designated per a CSI process configured for the terminal or per a CSI-IM constituting the CSI process.

6. The method according to claim 1, wherein the calculating the channel state information includes calculating the channel state information depending on the number of CSI processes configured for the terminal or the number of CSI-IMs constituting the CSI processes.

7. The method according to claim 6, wherein the interference cancellation is reflected in calculation of the channel state information if the number of CSI processes configured for the terminal or the number of CSI-IMs constituting the CSI processes is N (N is an integer greater than 1) or less, and the interference cancellation is not reflected in calculation of the channel state information if the number of CSI processes configured for the terminal or the number of CSI-IMs constituting the CSI processes exceeds N.

8. The method according to claim 1, wherein the calculating the channel state information includes calculating the channel state information depending on IDs (identifiers) of CSI processes configured for the terminal or CSI-IMs constituting the CSI processes.

9. The method according to claim 8, wherein the interference cancellation is reflected in calculation of the channel state information if an ID of a CSI process configured for the terminal or a CSI-IM constituting the CSI process is N (N is an integer greater than 1) or less, and the interference cancellation is not reflected in calculation of the channel state information if an ID of a CSI process configured for the terminal or a CSI-IM constituting the CSI process exceeds N.

10. A terminal having an interference cancellation capability, configured to report channel state information (CSI) in a wireless communication system, the terminal comprising:
a radio frequency (RF) unit; and
a processor configured to control the RF unit,
wherein the processor is further configured to:
receive, from a serving cell, information for cancellation of interference from a neighboring cell, the information including a CSI-interference measurement (IM) resource of the serving cell,
calculate the channel state information in accordance with the received information, and
transmit the calculated channel state to the serving cell, and
wherein the received information includes information indicating whether interference by a transmission signal of the neighboring cell exists in the CSI-IM resource of the serving cell.

11. The terminal according to claim 10, wherein the received information includes a cell ID (identifier) of the neighboring cell and a transmission mode related to the transmission signal.

12. The terminal according to claim 10, wherein the received information includes a zero-power channel state information-reference signal (CSI-RS) configuration of the neighboring cell.

13. The terminal according to claim 12, wherein, if a resource indicated by the zero-power CSI-RS configuration of the neighboring cell is the same as the CSI-IM resource of the serving cell, the processor is configured so as not to perform the interference cancellation in the CSI-IM resource, and if the resource indicated by the zero-power CSI-RS configuration of the neighboring cell is the same as the CSI-IM resource of the serving cell, the processor is configured to perform the interference cancellation in the CSI-IM resource.

14. The terminal according to claim 10, wherein the processor is configured to calculate the channel state information depending on whether the interference cancellation is reflected in calculation of the channel state information designated per a CSI process configured for the terminal or per a CSI-IM constituting the CSI process.

15. The terminal according to claim 10, wherein the processor is configured to calculate the channel state information depending on the number of CSI processes configured for the terminal or the number of CSI-IMs constituting the CSI processes.

16. The terminal according to claim 15, wherein the processor is configured to reflect the interference cancellation in calculation of the channel state information if the number of CSI processes configured for the terminal or the number of CSI-IMs constituting the CSI processes is N (N is an integer greater than 1) or less, and is configured so as not to reflect the interference cancellation in calculation of the channel state information if the number of CSI processes configured for the terminal or the number of CSI-IMs constituting the CSI processes exceeds N.

17. The terminal according to claim 10, wherein the processor is configured to calculate the channel state information depending on IDs (identifiers) of CSI processes configured for the terminal or CSI-IMs constituting the CSI processes.

18. The terminal according to claim 17, wherein the processor is configured to reflect the interference cancellation in calculation of the channel state information if an ID of a CSI process configured for the terminal or a CSI-IM constituting the CSI process is N (N is an integer greater than 1) or less, and is configured so as not to reflect the interference cancellation in calculation of the channel state information if an ID of a CSI process configured for the terminal or a CSI-IM constituting the CSI process exceeds N.

* * * * *